US007997081B2

(12) United States Patent
Edwards et al.

(10) Patent No.: US 7,997,081 B2
(45) Date of Patent: Aug. 16, 2011

(54) GAS DELIVERY SYSTEM

(75) Inventors: Andrew J. Edwards, Redding, CT (US); John S. Pifer, Easton, CT (US)

(73) Assignee: OfficePower, Inc., Norwalk, CT (US)

( * ) Notice: Subject to any disclaimer, the term of this patent is extended or adjusted under 35 U.S.C. 154(b) by 665 days.

(21) Appl. No.: 11/770,274

(22) Filed: Jun. 28, 2007

(65) Prior Publication Data

US 2009/0000302 A1 Jan. 1, 2009

(51) Int. Cl.

| | |
|---|---|
| ***F02C 9/00*** | (2006.01) |
| ***F02C 1/00*** | (2006.01) |
| ***F02K 3/00*** | (2006.01) |
| ***F02K 9/28*** | (2006.01) |
| ***F02K 9/00*** | (2006.01) |
| ***F02K 7/00*** | (2006.01) |

(52) U.S. Cl. ................ 60/772; 60/773; 60/698; 60/243; 60/244; 60/251; 60/252

(58) Field of Classification Search .................... 60/243, 60/244, 251, 252, 253, 772, 773, 783, 39.465; *F02C 9/00, 1/00; F02K 3/00, 7/00, 9/00, F02K 9/28*

See application file for complete search history.

(56) References Cited

U.S. PATENT DOCUMENTS

| | | | | |
|---|---|---|---|---|
| 6,175,210 | B1 * | 1/2001 | Schwartz et al. | 318/801 |
| 6,494,043 | B1 * | 12/2002 | Choroszylow et al. | 60/772 |
| 2006/0004242 | A1 * | 1/2006 | Verma et al. | 585/809 |

FOREIGN PATENT DOCUMENTS

WO WO2007046794 * 10/2005

* cited by examiner

*Primary Examiner* — Quyen Leung
*Assistant Examiner* — Terrance Kenerly
(74) *Attorney, Agent, or Firm* — Fiala & Weaver P.L.L.C.

(57) ABSTRACT

A gas delivery system includes a gas booster module for delivering natural gas from a utility gas service to power generation equipment installed in or around a building in a manner that meets the minimum volume and pressure requirements of the power generation equipment. The gas delivery system advantageously uses pipe of a relatively small size for delivering gas to the power generation equipment, thereby substantially reducing installation costs and eliminating the need for a welded gas line. The gas delivery system also provides a control system that facilitates close control over the gas flow and ensures compliance with local building codes and safety regulations and requirements.

21 Claims, 9 Drawing Sheets

SIDE ELEVATION

TOP ELEVATION

SIDE ELEVATION

OPTION 1
AIR COOLED

OPTION 2
REFRIGERATION

OPTION 3
CHILLED WATER

GAS DELIVERY SYSTEM

BACKGROUND OF THE INVENTION

1. Field of the Invention

The invention is generally related to a system and method for delivering natural gas from a utility gas service to power generation equipment installed in or around a building.

2. Background

Office building tenants across the country are increasingly sensitive to the quality and reliability of their electric power. Most are dramatically expanding their investment in and reliance upon sophisticated computer and telecommunications equipment and networks that are increasingly vulnerable to grid-related power fluctuations and outages. To retain existing tenants and to attract new ones, office building owners need to establish a new standard of service that delivers power with reliability and quality that effectively addresses these growing concerns.

One approach for providing such a standard of service involves installing on-site power generation equipment. Such power generation equipment may include state-of-the-art, gas-fired, distributed generation units that produce reliable, high-quality, and environmentally-friendly power and supplemental thermal energy. Such systems can provide an efficient way for office property owners to provide the power, reliability, and quality that will keep their facilities state-of-the-art and a step ahead of their competition. One method for installing and operating such equipment in a manner that mutually benefits both the installer of the equipment and the building owner is described in commonly-owned, co-pending U.S. patent application Ser. No. 11/586,646, entitled "Method for Providing Energy to a Building Using Utility-Compatible Distributed Generation Equipment", filed Oct. 26, 2006, the entirety of which is incorporated by reference herein.

Some power generation equipment operates on natural gas. When installing such equipment in an office building, several challenges arise. For example, gas-fired microturbines typically require natural gas to be supplied at some minimum volume of gas flow and some minimum level of gas pressure in order to operate. In some instances, the utility can provide the required volume of gas flow but cannot meet or maintain the required level of gas pressure. In other instances, although the utility can supply the required volume of gas flow and level of gas pressure, frictional loss associated with piping the gas from the utility interface to the power generation equipment can result in the gas being supplied to the equipment at less than the minimum pressure level.

Another challenge when installing on-site gas-fired power generation equipment is installing the requisite piping to deliver the natural gas between the utility gas service and the power generation equipment. For a variety of reasons, it is often desirable to use pipe having a relatively small diameter (e.g., a diameter of less than 4 inches) for this purpose. For example, the use of smaller pipe can substantially reduce installation costs as smaller pipe is less expensive and easier to install than larger pipe. Additionally, the building codes of some cities require that pipe above a certain diameter must be welded together during installation. In addition to being cost-prohibitive, such welding is time-consuming and generates unpleasant odors, which can be problematic when the building is already occupied by tenants.

Although the use of a smaller diameter pipe for the gas delivery line is desirable, it is also problematic in that it limits the volume of gas flow to the power generation equipment and increases frictional loss, which reduces gas pressure. As noted above, gas-fired microturbines typically require natural gas to be delivered at some minimum volume of gas flow and some minimum level of gas pressure in order to operate.

Finally, any natural gas delivery system installed in a multi-tenant building, such as an office building, will likely need to satisfy local building codes and stringent safety regulations and requirements. However, most commercially-available gas delivery systems, such as most commercially-available gas boosters, do not provide the requisite control system necessary to satisfy these codes, regulations and requirements.

What is needed then is a gas delivery system that is capable of delivering natural gas from a utility gas service to power generation equipment installed in or around a building in a manner that meets the minimum volume and pressure requirements of the power generation equipment. The desired gas delivery system should advantageously use pipe of a relatively small size for delivering gas to the power generation equipment, thereby substantially reducing installation costs and eliminating the need for a welded gas line. The desired gas delivery system should also provide a control system that facilitates close control over the gas flow and ensures compliance with local building codes and safety regulations and requirements.

BRIEF SUMMARY OF THE INVENTION

A gas delivery system of the present invention includes a gas booster module for delivering natural gas from a utility gas service to power generation equipment installed in or around a building in a manner that meets the minimum volume and pressure requirements of the power generation equipment. In accordance with an embodiment of the present invention, the gas delivery system advantageously uses pipe of a relatively small size for delivering gas to the power generation equipment, thereby substantially reducing installation costs and eliminating the need for a welded gas line. In accordance with a further embodiment of the present invention, the gas delivery system also includes a control system that facilitates close control over the gas flow and ensures compliance with local building codes and safety regulations and requirements.

In particular, a gas booster module in accordance with an embodiment of the present invention includes a common supply pipe, a common discharge pipe, a first gas booster and a second gas booster. The first gas booster has an inlet connected to the common supply pipe and a discharge connected to the common discharge pipe. The second gas booster has an inlet connected to the common supply pipe and a discharge connected to the common discharge pipe. Each of the first and second gas boosters is independently operable to receive a flow of natural gas from the common supply pipe and to discharge the flow of natural gas to the common discharge pipe at an elevated gas pressure. Each of the first and second gas boosters is also controllable to increase or reduce the volume of the flow of natural gas received and discharged by that booster responsive to the requirements of power generation equipment connected to the gas booster module via the common discharge pipe.

A power generation system in accordance with an embodiment of the present invention includes power generation equipment and a gas delivery system configured to provide natural gas from a utility gas supply to the power generation equipment. The gas delivery system includes a gas booster module and a control system electrically connected to the gas booster module. The gas delivery system is operable to receive a flow of natural gas from the utility gas supply and to discharge the flow of natural gas to the power generation equipment at an elevated gas pressure. The control system is configured to control the volume of the flow of natural gas to and from the gas booster module responsive to the requirements of the power generation equipment.

A method for supplying natural gas to power generation equipment in accordance with an embodiment of the present invention includes a number of steps. First, a selected one of a first gas booster and a second gas booster receives a flow of natural gas from a utility gas supply. Second, the flow of natural gas is discharged at an elevated gas pressure from the selected gas booster to the power generation equipment. Third, the selected gas booster is controlled to increase or reduce the volume of the flow of natural gas received and discharged by that booster responsive to the requirements of the power generation equipment.

A method for supplying natural gas to power generation equipment in accordance with an alternate embodiment of the present invention also includes a number of steps. First, a flow of natural gas is received in a first gas booster from a utility gas supply. Second, the flow of natural gas is discharged at an elevated gas pressure from the first gas booster. Third, the flow of natural gas from the first gas booster is received in a second gas booster. Fourth, the flow of natural gas is discharged at a further elevated gas pressure from the second gas booster to the power generation equipment.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
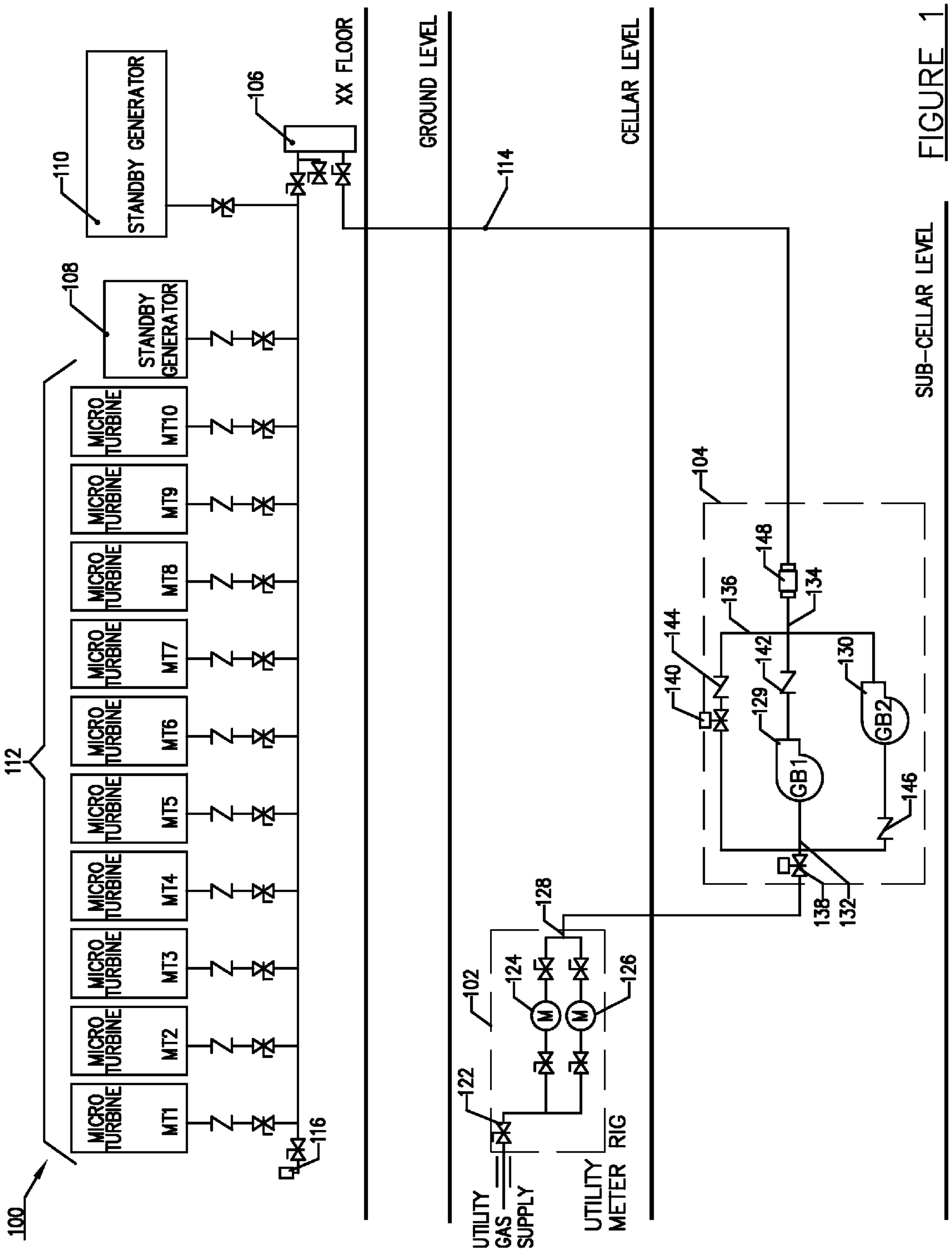
FIG. 1 is a system diagram of a power generation plant in which an embodiment of the present invention may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

FIG. 1 is a system diagram of a power generation plant 100 in which an embodiment of the present invention may operate. Power generation plant 100 may be installed in a multi-tenant office building in order to supply power and supplemental thermal energy thereto. The power produced by power generation plant 100 may be supplied either in conjunction with utility-supplied power or independently of utility-supplied power, such as during a power outage. In the latter mode of operation, power generation plant 100 provides back-up power to the building.

As shown in FIG. 1, power generation plant 100 includes ten gas-fired microturbines 112, designated MT1 through MT10 respectively, each of which is capable of producing approximately 100 kilowatts (kW) of power. In one operating environment, each microturbine is a TA-100 Combined Heating and Power (CHP) microturbine designed and supplied by Elliott Energy Systems, Inc. of Stuart, Fla. In order to operate, each microturbine must be provided with a continuous supply of natural gas. Furthermore, the natural gas must be supplied in a manner that meets or exceeds a predefined minimum gas flow volume and minimum level of gas pressure. These minimum values are typically set forth in product specifications or otherwise provided by the manufacturer of the microturbine.

The power generation plant also includes a 30 kW standby generator 108 and an optional 1,000 kW standby generator 110, the function of which will be described in more detail herein. Like microturbines 112, both standby generators 108 and 110 also require a supply of natural gas to operate. Microturbines 112, standby generator 108, and optional standby generator 110 may be collectively referred to herein as "the power generation equipment".

In the operating environment depicted in FIG. 1, the power generation equipment is installed on the rooftop of the office building. The natural gas supply for the office building is provided by a public utility, the interface to which is located at the cellar level of the building. A gas delivery system in accordance with the present invention is provided in the office building to deliver the natural gas from the gas utility interface to the power generation equipment. The major elements of the gas delivery system include a gas booster module 104, a control system associated therewith (not shown in FIG. 1), and all requisite piping from gas booster module 104 to the microturbines and standby generator(s).

As shown in FIG. 1, gas booster module 104 is located close to the point of entry of the utility gas service. The primary function of gas booster module 104 is to provide elevated gas pressure to the piping system to ensure that natural gas is delivered to the power generation equipment in a manner that meets all pressure and volume requirements of that equipment. As will be described in more detail herein, the gas delivery system enables the use of pipe having a relatively small diameter for delivering gas to the equipment, thereby substantially reducing installation costs and eliminating the need for a welded gas line. As will also be described in more detail herein, the gas delivery system also includes a control system that facilitates close control over the gas flow and ensures compliance with local building codes and safety regulations and requirements.

Power generation plant 100 of FIG. 1 will now be described in more detail. Persons skilled in the art will readily appreciate however that a gas delivery system in accordance with the present invention is not limited to the specific implementation and operating environment shown in FIG. 1. Rather, a gas delivery system in accordance with the present invention may advantageously be used to deliver natural gas from any of a variety of sources to any of a variety of equipment types, such as any type of gas-fired power generation equipment, to ensure that the gas is delivered in a manner that meets the pressure and volume requirements of that equipment.

As shown in FIG. 1, power generation plant 100 includes a utility meter rig 102 at the point of entry of the utility gas service. Utility meter rig 102 is used to house revenue meters provided by the gas utility and is typically designed in accordance with a specification provided by the utility. Utility meter rig 102 includes a main head valve 122, a duplex meter that includes a first revenue meter 124 and a second revenue meter 126, and associated piping.

Main head valve 122 is a point of demarcation between the gas piping installed by the utility and gas piping to be installed by or on behalf of the building owner. When open, main head valve 122 allows natural gas supplied by the utility to flow to the duplex meter via an 8-inch diameter pipe. The natural gas flows from the 8-inch diameter pipe to one or both of revenue meters 124 and 126 along respective 6-inch diameter pipes, depending on the state of manual isolation valves associated with each of those meters, as shown in FIG. 1. The revenue meters monitor the volume of gas provided from the utility gas service to the gas delivery system for the purposes of charging for the supplied gas. The manual isolation valves associated with each meter allow an entity, such as the gas utility, to inspect, service or replace one meter while maintaining gas flow to the building through the other meter. Gas flowing through each meter exits utility meter rig through a common 8-inch diameter discharge pipe 128.

From utility meter rig 102, natural gas flows via discharge pipe 128 to gas booster module 104. As noted above, gas booster module 104 ensures that gas received from the utility via the meter rig is delivered to the power generation equipment in a manner that meets all pressure and volume requirements of that equipment. In the example operating environment of FIG. 1, the use of an 8-inch diameter pipe for receiving gas from the utility gas service ensures that the requisite volume of gas flow is supplied by the gas delivery system. In further accordance with this example, however, the gas utility is only able to guarantee that natural gas will be provided to the building at a very low gas pressure of 4 inches of water column (inWC). In contrast, each of the microturbines 112 requires gas to be supplied to it at a minimum gas pressure of approximately 5 inWC in order to operate. Even more preferably, gas should be supplied to the inlets of microturbines 112 at a minimum gas pressure of approximately 7 inWC as specified by the manufacturer. Thus, the gas booster module must elevate the gas pressure to the piping system to ensure that gas reaching the microturbines has a gas pressure of at least 7 inWC. In addition, the gas booster module must also optionally elevate the gas pressure to meet the pressure requirements of 1,000 kW standby generator 110.

In addition to elevating the gas pressure to meet the minimum pressure requirements of the power generation equipment, gas booster module 104 must also elevate the gas pressure to compensate for the use of a 3-inch diameter pipe to carry the gas through the office building. The use of pipe having such a small diameter restricts the volume of gas flow to the power generation equipment and also increases frictional loss, which reduces gas pressure. The longer the 3-inch diameter pipe that is used, the greater the frictional loss.

However, the use of a 3-inch diameter pipe is desirable because smaller pipe is less expensive and easier to install than larger pipe, thereby allowing installation costs to be reduced. Additionally, in the example operating environment of FIG. 1, local building codes require that pipe of 4 inches in diameter or greater must be welded together during installation. In addition to being cost-prohibitive, such welding is time-consuming and generates unpleasant odors, which can be problematic when the building is already occupied by tenants. In contrast, 3-inch diameter pipe can be screwed together using a threaded connection. Accordingly, the gas booster module 104 is used to raise gas pressure so that a 3-inch diameter pipe can be used to provide the same volume of gas flow received from the utility via the 8-inch diameter pipe while maintaining at least the minimum gas pressure level required by the power generation equipment.

As shown in FIG. 1, gas booster module 104 preferably includes a first gas booster 129 (denoted "GB1") and a second gas booster 130 (denoted "GB2") arranged in a duplex configuration. This configuration ensures that if one gas booster is taken off-line for inspection or service or fails unexpectedly, the other gas booster can be brought on-line (either manually or automatically) to perform the gas boosting function. If only a single gas booster were used to implement gas booster module 104, that gas booster could become a single point of failure for the entire power generation plant 100, since the power generation equipment would not work without the requisite supply of gas. Accordingly, the duplex configuration achieves a higher level of reliability by providing redundancy to the gas delivery system.

In the implementation shown in FIG. 1, each gas booster 129 and 130 is a single-stage gas booster having a similar or identical design. In particular, each gas booster is an HB-4628-10 hermetic gas booster designed and supplied by Eclipse, Inc. of Rockford, Ill. These units are 10 horse power units capable of providing pressure boosts of approximately 35 inWC at gas flows of up to approximately 46,300 cubic feet per hour (CFH). However, other gas boosters may be used.

Natural gas is received by gas booster module 104 via an 8-inch diameter common supply pipe 132 and flows to either gas booster 129 or gas booster 130 along a respective one of two 8-inch diameter pipes, depending on which gas booster is currently operating. The gas flow through common supply pipe 132 can be controlled via an inlet valve 138, which is open during normal operation. The operating gas booster delivers a flow of natural gas at an increased gas pressure to a 4-inch diameter common discharge pipe 134.

As shown in FIG. 1, a bypass pipe 136 is coupled to common discharge pipe 134 and may be used to recirculate natural gas flowing from the discharge of gas boosters 129 and 130 back to the inlet of those boosters. As will be described in more detail herein, such recirculation may be necessary when the volume of natural gas flowing through the operating gas booster is not sufficient to cool the motor of that booster. This may occur, for example, when less than all of microturbines 112 are operating. A motorized valve 140 is used to control the amount of natural gas that is recirculated through bypass pipe 136.

Check valves 142, 144 and 146 are used in gas booster module 104 to ensure that gas flows in one direction only. A flame arrestor 148 is provided along common discharge pipe 134 in order to comply with local regulatory requirements.

Natural gas discharged from gas booster module 104 flows through piping 114 to the power generation equipment installed on the rooftop of the building. As discussed above, piping 114 preferably comprises pipes of a relatively small diameter, such as 3-inch diameter pipe. At the rooftop, the natural gas passes through a gas filter 106, which removes undesired particulate matter from the natural gas before it is supplied to the power generation equipment. Such a gas filter may be purchased from any number of vendors and should be sized based on the volume of gas flow, the gas pressure, and the pipe size. As shown in FIG. 1, manual isolation valves are provided both at the inlet and discharge of gas filter 106 to allow gas filter 106 to be inspected, serviced or replaced.

From the discharge of gas filter 106, natural gas flows to the power generation equipment, which includes microturbines 112, standby generator 108 and standby generator 110. Gas is delivered to the inlet of each microturbine 112 via a 2-inch diameter pipe and is delivered to the inlet of standby generator 108 via a 1.5-inch diameter pipe. As shown in FIG. 1, a manual isolation valve and check valve is provided at the inlet of each of microturbines 112 and standby generator 108. Also, a purge point 116 is provided at the end of the gas line to allow the purging of air from the gas delivery system.

Standby generator 108 is a gas generator that can be used during a power outage to start the auxiliary systems necessary to run microturbines 112. In one operating environment, standby generator 108 is a 30 kW generator designed and supplied by Kohler Power Systems of Kohler, Wis., although many other gas generators may be used. In an alternative implementation, a battery-based uninterrupted power supply (UPS) system can be used instead of a gas generator, although UPS systems are typically more expensive to purchase and maintain.

As noted above, the power generation equipment of power generation plant 100 may also include an optional 1,000 kW gas-fired standby generator 110. Such a standby generator may be used to generate power for the building in the instance that one or more of microturbines 112 fail to operate. Alternatively or additionally, standby generator 110 may be operated in conjunction with microturbines 112 to provide an increased supply of power to the building. In implementations where standby generator 110 is operated concurrently with microturbines 112, gas booster module 104 must be configured to supply the requisite volume of gas flow and gas pressure necessary to operate both microturbines 112 and standby generator 110. In an implementation that does not include such a standby generator, a tap may nevertheless be provided along the gas line for the installation of future equipment.

In accordance with one implementation, when power generation plant 100 is fully operational, gas booster module 104 is capable of supplying a volume of gas flow of approximately 28,413 cubic feet per hour under standard operating conditions (Schf). Of this gas flow, it is anticipated that approximately 14,400 Scfh will be consumed by microturbines 112, approximately 13.0 Scfh will be consumed by standby generator 108, and roughly 14,000 Scfh will be consumed by optional standby generator 110.

Figure 2:
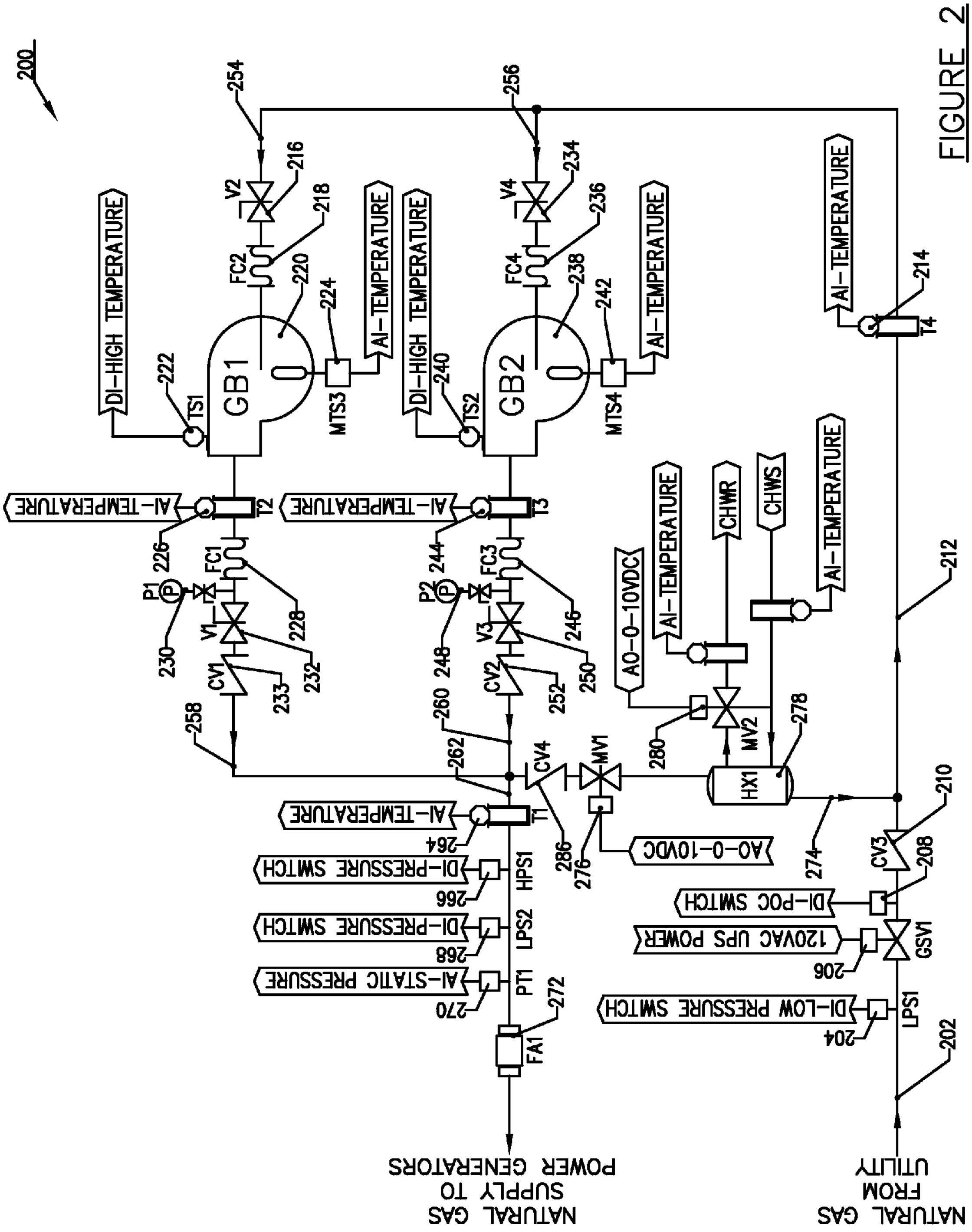
FIG. 2 is a system diagram illustrating an implementation of a gas booster module in accordance with the present invention.

B. Example Gas Booster Module in Accordance with an Embodiment of the Present Invention FIG. 2 is a system diagram illustrating a gas booster module 200 in accordance with an embodiment of the present invention. Gas booster module 200 may be used, for example, to perform the function of gas booster module 104 depicted in FIG. 1. It is noted that the implementation shown in FIG. 2 is provided by way of example only and is not intended to limit the present invention. Persons skilled in the art will readily appreciate that alternative implementations of gas booster module 104 may be used within the scope and spirit of the present invention.

The elements of gas booster module 200 will now be described. In FIG. 2, the direction of the flow of natural gas through gas booster module 200 during normal operating modes is indicated by large black arrows. Check valve 210 (denoted "CV3"), check valve 233 (denoted "CV1"), check valve 252 (denoted "CV2") and check valve 286 (denoted "CV4") are installed along pipes of gas booster module 200 to ensure that natural gas flows in one direction only.

As shown in FIG. 2, natural gas is supplied to gas booster module 200 from a utility service via an inlet pipe 202. A low pressure switch 204 (denoted "LPS1") is installed along inlet pipe 202 to ensure that gas pressure in the pipe always exceeds a certain minimum pressure level as specified by the utility. In one embodiment, low pressure switch 204 is configured to close if the gas pressure in inlet pipe 202 drops below approximately 2 inWC. As shown in FIG. 2, low pressure switch 204 is also configured to provide a digital input signal to a control system associated with gas booster module 200 (not shown in FIG. 2) indicating whether the switch is open or closed.

From inlet pipe 202, natural gas flows to a common supply pipe 212 that is connected to a first gas booster 220 (denoted "GB1") via a first gas booster inlet pipe 254 and to a second gas booster 238 (denoted "GB2") via a second gas booster inlet pipe 256. For safety reasons, an electro-hydraulic gas safety valve 206 (denoted "GSV1") is installed between inlet pipe 202 and common supply pipe 212 to control the flow of gas there between. Gas safety valve 206 is configured such that it will only open and remain open when 120 volts alternating current (VAC) of power is applied to the valve. However, if for any reason power is lost to the valve, it will shut. This permits the control system associated with gas booster module 200 to quickly close gas safety valve 206 in the event that an abnormal operating condition is detected, thereby shutting off the supply of natural gas to the building. Such an abnormal operating condition might include the detection of a ruptured gas line or the pressing of an emergency stop button provided as part of the control system.

As shown in FIG. 2, the requisite 120 VAC signal for opening gas safety valve 206 is provided from a UPS system rather than from a utility. This ensures that gas delivery to the power generation equipment can be achieved even during a grid outage. A proof of closure (POC) switch 208 is further provided as an auxiliary contact to gas safety valve 206. POC switch 208 provides a digital input signal to the control system associated with gas booster module 200 that verifies whether or not gas safety valve 206 is open or closed.

From common supply pipe 212, natural gas will flow to either first gas booster 220 via first gas booster inlet pipe 254 or to second gas booster 238 via second gas booster inlet pipe 256, depending on which gas booster is currently operating. This duplex configuration ensures that if one gas booster is taken off-line for inspection or service or fails unexpectedly, the other gas booster can be brought on-line (either manually or automatically) to perform the gas boosting function. In one implementation, gas boosters 220 and 238 are each single-stage gas boosters having a similar or identical design. For example, each gas booster 220 and 238 may be an HB-4628-10 hermetic gas booster designed and supplied by Eclipse, Inc. of Rockford, Ill. As noted above, these units are 10 horse power units capable of providing pressure boosts of approximately 35 inWC at gas flows of up to approximately 46,300 CFH.

The inlet of first gas booster 220 is connected to first gas booster inlet pipe 254 via a flexible connector 218 (denoted "FC2") while the inlet of second gas booster 238 is connected to second gas booster inlet pipe 256 via a flexible connector 236 (denoted "FC4"). In a like manner, a flexible connector 228 (denoted "FC1") is used to connect the discharge of first gas booster 220 to a first gas booster discharge pipe 258 and a flexible connector 246 (denoted "FC3") is used to connect the discharge of second gas booster 238 to a second gas booster discharge pipe 260. These flexible connectors are intended to prevent the transmission of vibrational energy from the gas boosters to the respective inlet pipes and discharge pipes. The transmission of such energy is to be avoided as it can damage the piping of the gas delivery system, any equipment attached thereto, or the building itself.

A manual isolation valve 216 (denoted "V2") is provided along first gas booster inlet pipe 254 while another manual isolation valve 232 (denoted "V1") is provided along first gas booster discharge pipe 258. These manual isolation valves can be closed to stop the flow of gas to first gas booster 220, thereby allowing first gas booster 220 to be inspected, serviced or replaced. In a like manner, manual isolation valves 234 (denoted "V4") and 250 (denoted "V3") are provided along second gas booster inlet pipe 256 and second gas booster discharge pipe 260, respectively, and may be closed to allow second gas booster 238 to be inspected, serviced or replaced.

During operation, first gas booster 220 discharges a flow of pressure-boosted natural gas to a common discharge pipe 262 via first gas booster discharge pipe 258. In a like manner, during operation, second gas booster 238 discharges a flow of pressure-boosted natural gas to common discharge pipe 262 via second gas booster discharge pipe 260. The control system associated with gas booster module 200 drives each of the two gas boosters using a corresponding variable frequency drive, thereby allowing the control system to modulate the amount of gas flow through each gas booster. Such a capability is important to maintain better control of the gas flow during load-following operation.

From common discharge pipe 262, natural gas flows to the power generation equipment via a pipe or system of pipes (not shown in FIG. 2). As shown in FIG. 2, installed along common discharge pipe 262 are a high pressure switch 266 (denoted "HPS1"), a low pressure switch 268 (denoted "LPS2"), an analog pressure transmitter 270 (denoted "PT1") and a flame arrestor 272 (denoted "FA1").

High pressure switch 266 is a switch that is configured to close when the gas pressure in common discharge pipe 262 exceeds a predetermined maximum gas pressure, thereby cutting off the supply of natural gas to the power generation equipment. For example, in one embodiment, high pressure switch 266 is configured to close when the gas pressure in common discharge pipe 262 exceeds approximately 3 pounds per square inch (PSI). As shown in FIG. 2, high pressure switch 266 is also configured to provide a digital input signal to the control system associated with gas booster module 200 indicating whether the switch is open or closed. High pressure switch 266 may be installed as a safety precaution and/or to comply with local safety regulations or requirements.

Low pressure switch 268 is a switch that is configured to close when the gas pressure in common discharge pipe 262 drops below a predetermined minimum gas pressure, thereby cutting off the supply of natural gas to the power generation equipment. Low pressure switch 268 is installed to ensure that the gas delivery system is shut down when there is an unusually low pressure discharge from gas booster module 200, which could indicate a rupture in the gas delivery line running up through the building. As shown in FIG. 2, low pressure switch 268 is also configured to provide a digital input signal to the control system associated with gas booster module 200 indicating whether the switch is open or closed. Like high pressure switch 266, low pressure switch 268 may be installed as a safety precaution and/or to comply with local safety regulations and requirements.

Analog pressure transmitter 270 is a sensor that measures the gas pressure within common discharge pipe 262 and provides the gas pressure measurement information as an analog input signal to the control system associated with gas booster module 200. The control system in turn displays the gas pressure measurement information to a user. This information can be monitored by the user or the control system itself to determine if gas booster module 200 is working properly and whether there is an unsafe condition based on the gas pressure within common discharge pipe 262 being too low or too high.

Furthermore, such gas pressure measurement information can be used to monitor whether or not gas booster module 200 is discharging natural gas at a level of pressure that is sufficient to meet the pressure requirements of the power generation equipment. In situations where gas booster module 200 is not discharging natural gas at the requisite level of pressure, the control system can be used to increase the speed of the variable frequency drive associated with first gas booster 220 or the variable frequency drive associated with second gas booster 238 to raise the gas pressure at the discharge of gas booster module 200. Conversely, if gas booster module 200 is discharging natural gas at a pressure level that exceeds that required to operate the power generation equipment, the control system can be used to decrease the speed of the variable frequency drive associated with first gas booster 220 or the variable frequency drive associated with second gas booster 238 to lower the gas pressure at the discharge of gas booster module 200 and thereby conserve cost. Depending upon the implementation, the monitoring of the gas pressure measurement information and corresponding adjustment of the speed of the variable speed drives can either be performed manually by a user or automatically by the control system itself.

Flame arrestor 272 is provided along common discharge pipe 262 in order to comply with local regulatory requirements. Flame arrestor 272 is designed to extinguish a flame that might be ignited within common discharge pipe 262 and thereby prevent the propagation of the flame through the piping system to the rooftop of the building.

As shown in FIG. 2, gas booster module 200 also includes a bypass pipe 274 that connects first gas booster discharge pipe 258 and second gas booster discharge pipe 260 back to common supply pipe 212. Based on the state of a first motorized valve 276 (denoted "MV1") installed along bypass pipe 274, a certain amount of the natural gas that would normally flow to common discharge pipe 262 may be recirculated back to common supply pipe 212 to feed the inlet of first gas booster 220 or second gas booster 238. While passing through bypass pipe 274, the recirculated natural gas will pass through a heat exchanger 278 (denoted "HX1") that can be used to cool the natural gas. The amount of cooling applied is controlled through the operation of a second motorized valve 280 (denoted "MV2"), which in turn controls an amount of chilled water that is supplied and returned through heat exchanger 278. In FIG. 2, the chilled water supply is denoted "CHWS" and the chilled water return is denoted "CHWR".

The above-described bypass system is provided in order to ensure that the volume of natural gas flowing through the operating gas booster is sufficient to cool the motor of that booster. If the flow of natural gas through a gas booster is reduced for some reason (e.g., a failure of one or more microturbines or the operation of only a single microturbine for testing purposes), then the gas booster motor windings and motor itself will begin to increase in temperature. Unchecked, this heating can result in damage to the motor and, ultimately, failure of the gas booster.

By monitoring the temperature of the natural gas flowing through gas booster module 200, the control system associated therewith can modulate the amount of gas that is recirculated through the bypass system via the controlled opening and closing of first motorized valve 276 as well as the amount of cooling applied to the recirculated gas through the controlled opening and closing of second motorized valve 280. As shown in FIG. 2, the control system controls the state of each of first motorized valve 276 and second motorized valve 280 through the application of a corresponding output signal that varies from 0 to 10 volts DC (VDC). The motorized valves are opened in proportion to the magnitude of the signal and can open anywhere from 0-100%.

In order to monitor the temperature of natural gas flowing through gas booster module 200, the module includes a plurality of temperature sensors including a temperature sensor 214 (denoted "T4"), a temperature sensor 226 (denoted "T2"), a temperature sensor 244 (denoted "T3") and a temperature sensor 264 (denoted "T1"). Each of these temperature sensors measures the temperature of the natural gas flowing through a pipe of gas booster module 200 and provides the gas temperature measurement information as an analog input to the control system associated with gas booster module 200. In particular, temperature sensor 214 measures the temperature of the gas flowing through common supply pipe 212, temperature sensor 226 measure the temperature of the gas being discharged by first gas booster 220 into first gas booster discharge pipe 258, temperature sensor 244 measures the temperature of the gas being discharged by second gas booster 238 into second gas booster discharge pipe 260, and temperature sensor 264 measures the temperature of the gas flowing through common discharge pipe 262. In one embodiment, each temperature sensor is implemented using a thermistor-type temperature sensor, although the invention is not so limited. Each temperature sensor may be mounted in a well within a pipe of gas booster module 200 for easy removal and replacement.

In one implementation of the present invention, a three-level control scheme is applied to respond to increased temperature information reported from one or more of the temperature sensors. In accordance with such a scheme, if the temperature of the natural gas increases into a first temperature range, motorized valves 276 and 280 are opened to recirculate natural gas through the bypass system and to cool the recirculated gas. If the temperature of the natural gas nevertheless increases into a second temperature range, then the gas booster that is currently operating is shut down and the other gas booster is brought on-line. After this, if the temperature of the natural gas increases into a third temperature range, the entire gas booster module is shut down, gas safety valve 206 is closed, and one or more alarms are optionally sounded. It is noted that this control scheme is provided by way of example only, and persons skilled in the art will readily appreciate that a wide variety of other control schemes may be used to monitor and respond to changing gas temperatures as reported by gas booster module 200.

In addition to using the temperature information provided by temperature sensors 214, 226, 244 and 264 to control the amount of gas that is recirculated through the bypass system as well as the amount of cooling that is applied to such recirculated gas, the control system can also monitor such temperature information to detect abnormal or unsafe operating conditions.

Gas booster module 200 includes other temperature switches and sensors for control and safety reasons. For example, first gas booster 220 and second gas booster 238 each include a motor temperature switch that is mounted in the windings of the motor of the gas booster. In particular, first gas booster 220 includes a motor temperature switch 224 (denoted "MTS3") and second gas booster 238 includes a motor temperature switch 242 (denoted "MTS4"). In one implementation, each motor temperature switch is a thermal contact switch that opens if the windings of the motor reach or exceed a certain temperature (e.g., 240 degrees), thereby shutting down the gas booster. In such an implementation, each motor temperature switch provides a digital input signal to the control system associated with gas booster module 200 that indicates the state of the switch. In an alternate implementation, each motor temperature switch may be a temperature sensor that provides an analog input signal to the control system indicating the temperature of the motor of the gas booster. This temperature may be monitored by the control system to identify abnormal operating conditions and shut down the gas booster if necessary.

As shown in FIG. 2, a temperature switch is also surface mounted on the metal casing of each of first gas booster 220 and second gas booster 238. In particular, a temperature switch 222 (denoted "TS1") is surface mounted on first gas booster 220 and a temperature switch 240 (denoted "TS2") is surface mounted on second gas booster 238. Each temperature switch is configured to open if the temperature of the metal casing of the gas booster reaches or exceeds a certain temperature (e.g., 190° F.), thereby shutting down the gas booster and optionally closing gas safety valve 206. Such an increase in the temperature of the metal casing could be indicative of an abnormal or unsafe operating condition. For example, such an increase in temperature might indicate that the fan inside the gas booster has shifted and is rubbing against the exterior casing of the gas booster. Such a situation is extremely dangerous, as a breach of the metal exterior of the booster in conjunction with high heat could cause an ignition of the natural gas.

As also shown in FIG. 2, a first pressure gauge 230 (denoted "P1") is installed along first gas booster discharge pipe 258 and a second pressure gauge 248 (denoted "P2") is installed along second gas booster discharge pipe 260. The pressure gauges may be visibly inspected to determine the level of gas pressure within the respective gas booster discharge pipes.

Figure 3A:
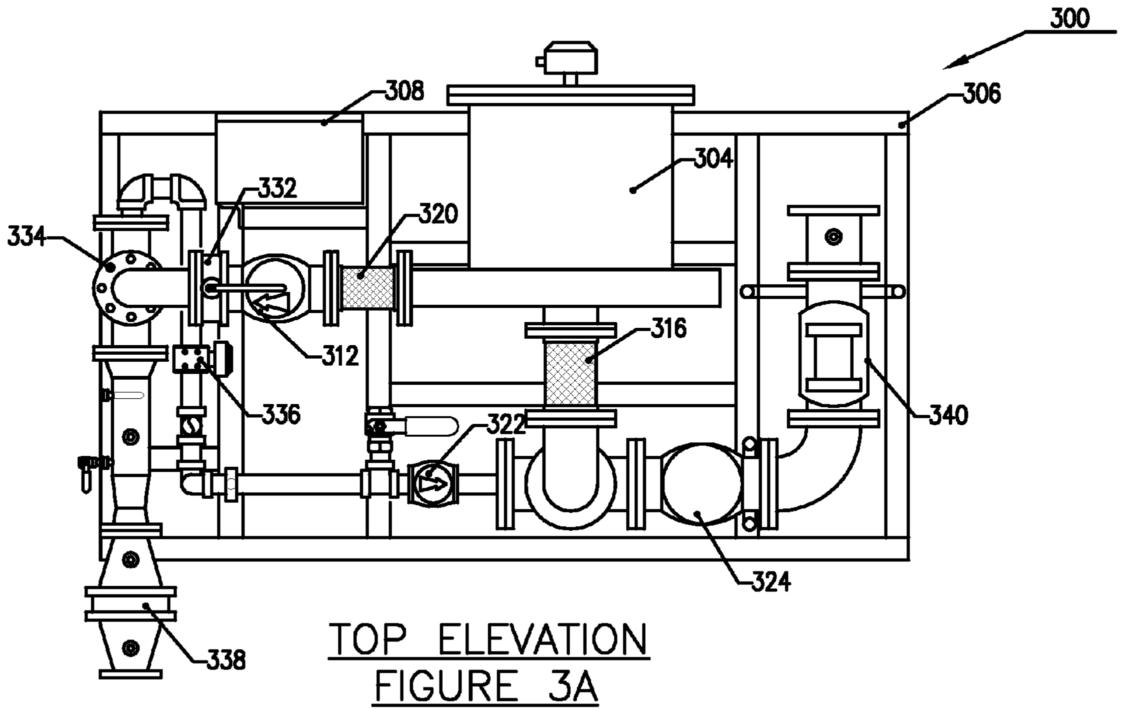
FIG. 3A depicts a top elevation view of a gas booster module in accordance with an embodiment of the present invention.
Figure 3B:
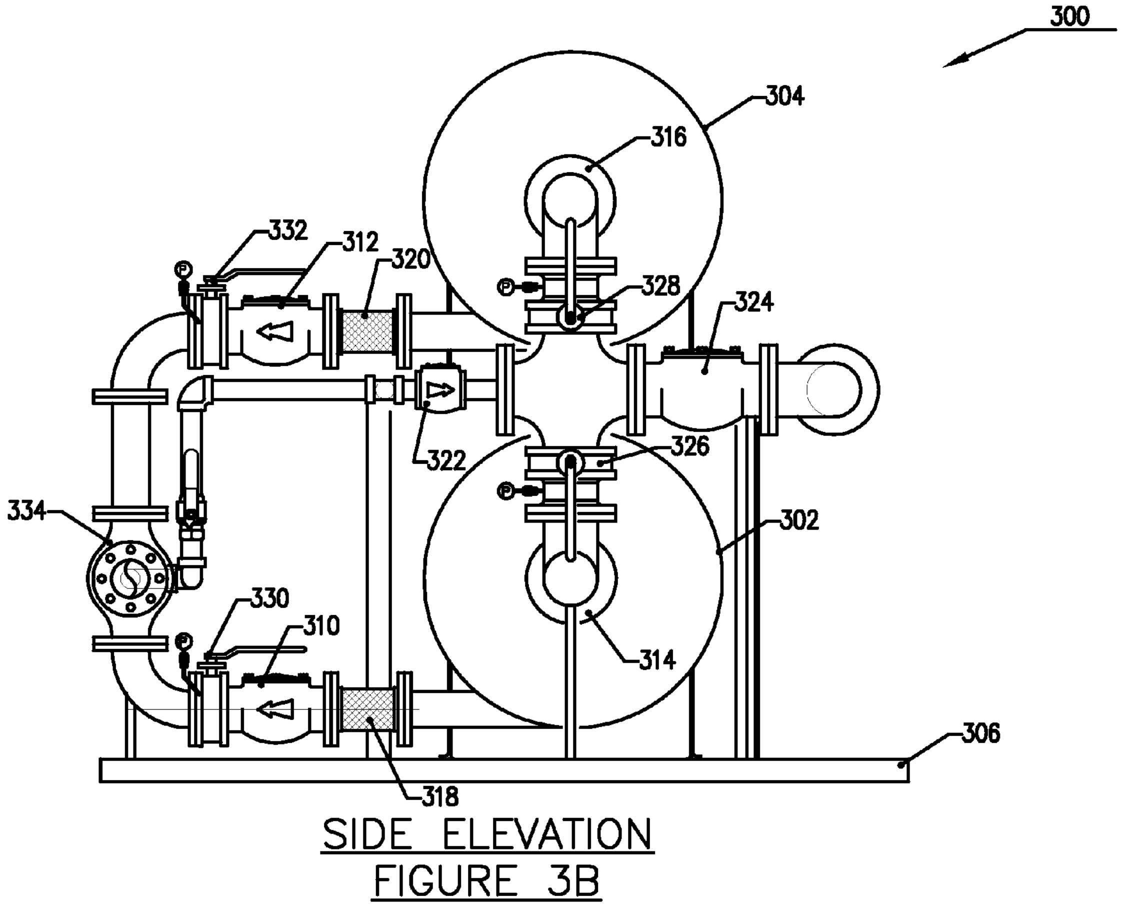
FIG. 3B depicts a side elevation view of a gas booster module in accordance with an embodiment of the present invention.

FIGS. 3A and 3B depict a top elevation view and a side elevation view, respectively, of a particular implementation of a gas booster module 300 in accordance with the present invention. As shown in these figures, gas booster module 300 includes a first gas booster 302, a second gas booster 304, a control panel 308, and piping for supplying and discharging natural gas from first and second gas boosters 302 and 304, all of which are mounted on a base steel frame 306.

Control panel 308 provides an interface between gas booster module 300 and a control system associated therewith, which will be described in more detail herein.

As shown in FIGS. 3A and 3B, gas booster module 300 includes a gas safety valve 340 that is used to control the amount of gas that flows into the supply piping. Gas booster module 300 also includes a plurality of check valves to ensure that gas flows in one direction only. In particular, a 6-inch flanged check valve 324 is connected to the supply piping to ensure that natural gas flows toward the gas boosters. Additionally, a first 4-inch gas check valve 310 is connected to the discharge of first gas booster 302 to ensure that gas flows away from first gas booster 302, while a second 4-inch gas check valve 312 is connected to the discharge of second gas booster 304 to ensure that gas flows away from second gas booster 304. Furthermore, a two-inch threaded check valve 322 is connected to a bypass pipe that connects the discharge piping of gas booster module 104 back to the supply piping to ensure that gas in the bypass pipe flows away from the discharge piping.

As also shown in FIGS. 3A and 3B, gas booster module 300 includes flexible connectors at both the inlet and discharge of each gas booster to ensure that the piping system is not damaged by vibrations generated by the gas boosters. In particular, a first six-inch flanged stainless steel flexible connector 314 is used to connect the inlet of first gas booster 302 to the supply piping while a second six-inch flanged stainless steel flexible connector 316 is used to connect the inlet of second gas booster 304 to the supply piping. Additionally, a first four-inch flanged stainless steel flexible connector 318 is used to connect the discharge of first gas booster 302 to the discharge piping and a second four-inch flanged stainless steel flexible connector 320 connects the discharge of second gas booster 304 to the discharge piping.

Manual isolation valves are also provided at the inlet and discharge of each gas booster so that each gas booster may be taken off-line for inspection, servicing or replacement. In particular, a first six-inch flanged manual isolation valve 326 is located at the inlet to first gas booster 302 while a first four-inch flanged manual isolation valve 330 is located at the discharge thereof. Likewise, a second six-inch flanged manual isolation valve 328 is located at the inlet to second gas booster 304 while a second four-inch flanged manual isolation valve 332 is located at the discharge thereof.

As further shown in FIGS. 3A and 3B, the discharge piping includes a six-inch flanged 4-way tee component 334 that connects the discharge piping from the first and second gas boosters to the a common discharge pipe as well as to the bypass pipe. A 2-inch automatic balance valve 336 is connected to the bypass pipe and is opened or closed by a 0-10 VDC signal generated by the control system associated with gas booster module 300 in order to control the amount of natural gas recirculated from the discharge piping to the supply piping. A gas safety valve 338 is installed at the termination of the discharge piping, where such piping is connected to power generation equipment via a pipe or system of pipes.

Figure 8:
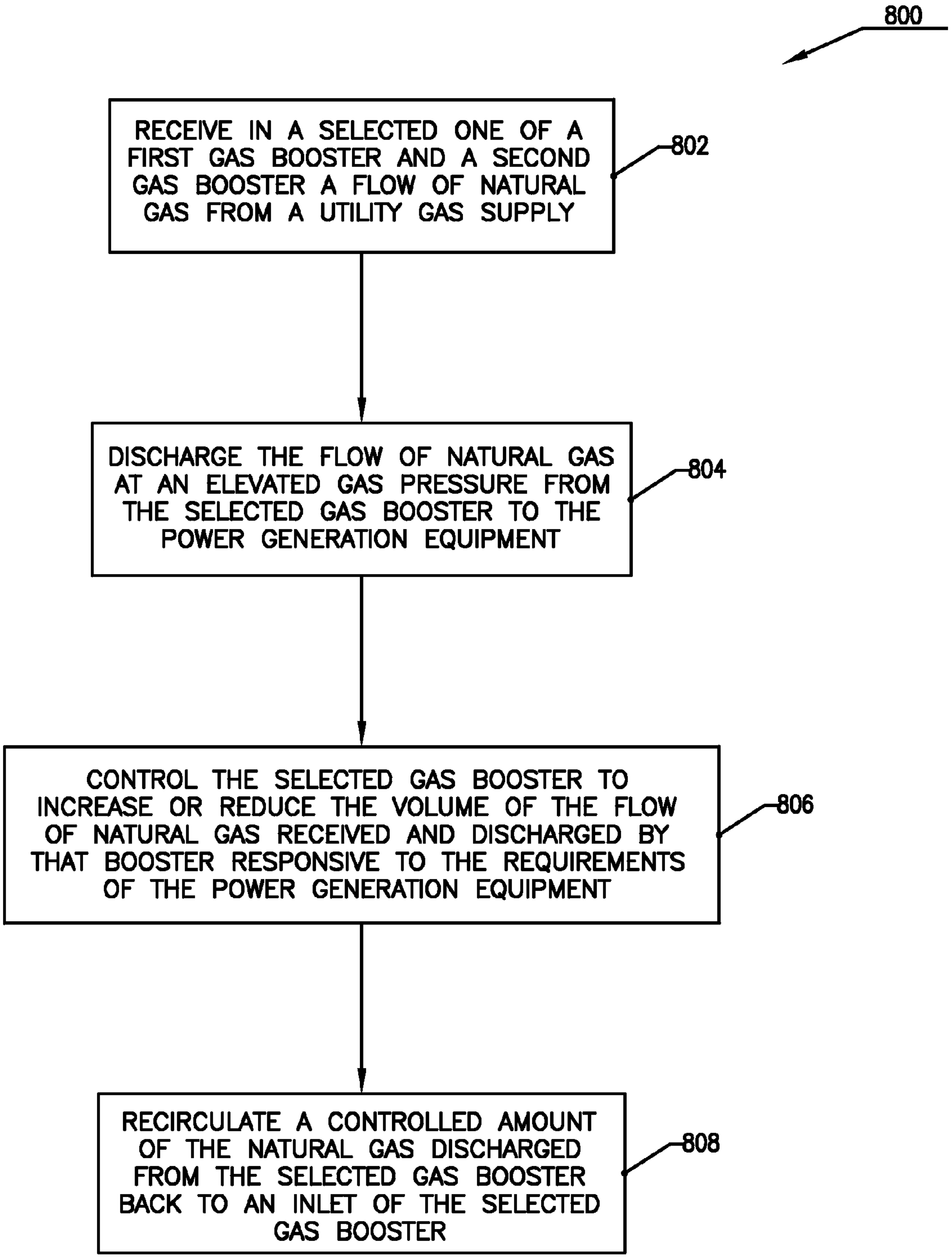
FIG. 8 is a flowchart of a method for supplying natural gas to power generation equipment in accordance with an embodiment of the present invention.

FIG. 8 is a flowchart of an example method 800 for supplying natural gas to power generation equipment using a gas booster module in accordance with the present invention. The method of flowchart 800 will be described with reference to gas booster module 200 of FIG. 2, as described above, although the method is not limited to that embodiment.

As shown in FIG. 8, the method of flowchart 800 begins at step 802, in which a flow of natural gas from a utility gas supply is received in a selected one of either first gas booster 220 or second gas booster 238. At step 804, the selected gas booster discharges the flow of natural gas at an elevated gas pressure to the power generation equipment. At step 806, the selected gas booster is controlled to increase or reduce the volume of the flow of natural gas received and discharged by the selected booster responsive to the requirements of the power generation equipment. At step 808, a controlled amount of natural gas discharged from the selected gas booster is recirculated back to the inlet of the selected gas booster.

Figure 4:
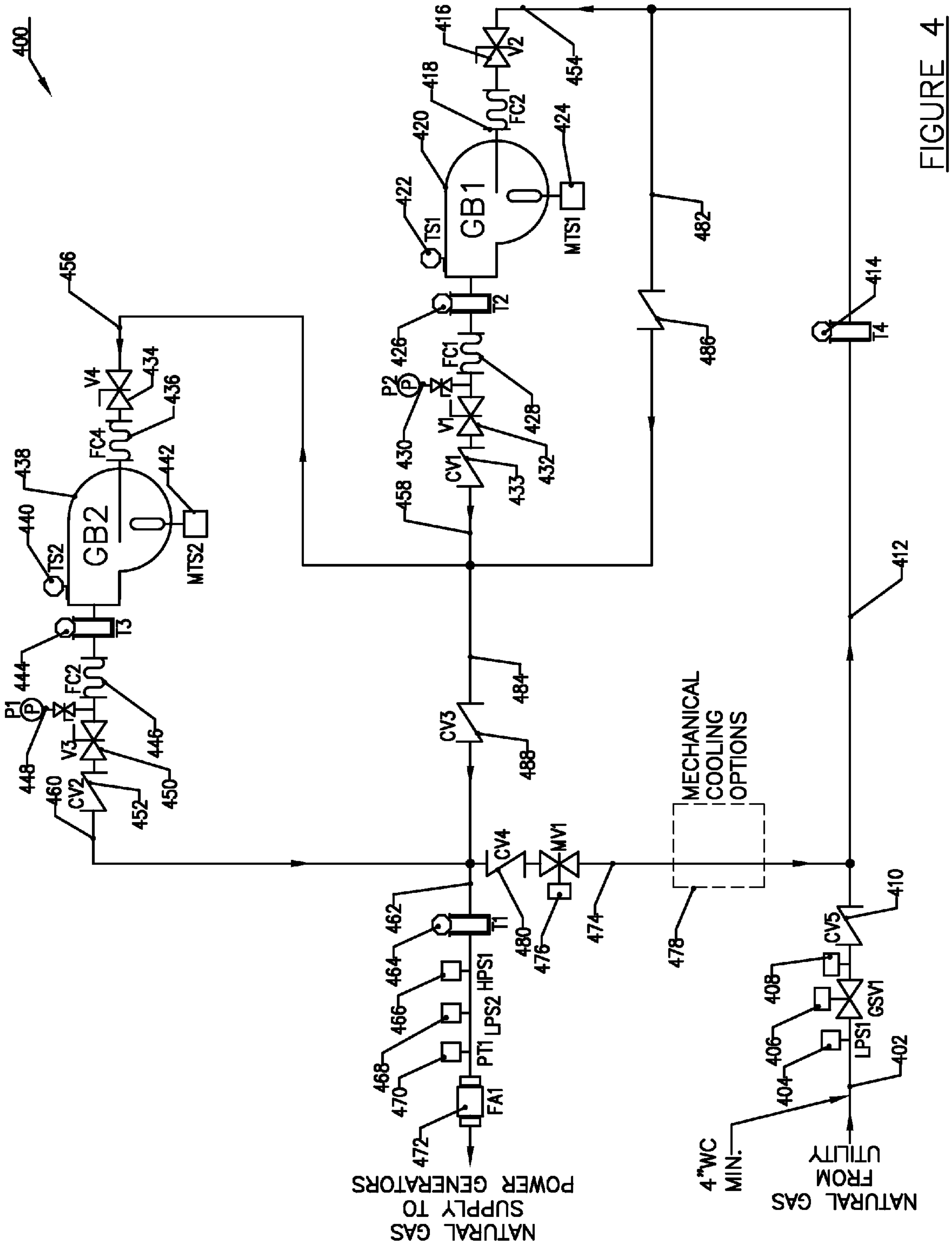
FIG. 4 is a system diagram illustrating an alternate implementation of a gas booster module in accordance with the present invention.

C. Alternative Gas Booster Module in Accordance with an Embodiment of the Present Invention FIG. 4 is a system diagram illustrating an alternative gas booster module 400 in accordance with an embodiment of the present invention that includes a first gas booster 420 (denoted "GB1") and a second gas booster 438 (denoted "GB2"). In one implementation, gas boosters 420 and 438 are each single-stage gas boosters having a similar or identical design. A control system associated with gas booster module 400 drives each of the two gas boosters using a corresponding variable frequency drive, thereby allowing the control system to modulate the amount of gas flow through each gas booster.

As will be described in more detail below, gas booster module 400 is configured such that three modes of operation are possible: in a first mode of operation, only first gas booster 420 performs the gas boosting function, in a second mode of operation, only second gas booster 438 performs the gas boosting function, while in a third mode of operation first gas booster 420 and second gas booster 438 operate in series to perform the gas boosting function. In the first and second modes of operation, only a single gas booster is used at a time, in a like manner to the system discussed above in reference to FIG. 2. The third mode of operation can optionally be used to generate an increased level of gas pressure for installations having larger loads.

The direction of the flow of natural gas through gas booster module 400 during the various operating modes is indicated by black arrows. Check valve 410 (denoted "CV5"), check valve 433 (denoted "CV1"), check valve 452 (denoted "CV2"), check valve 480 (denoted "CV4"), check valve 486, and check valve 488 (denoted "CV3") are installed along pipes of gas booster module 400 to ensure that natural gas flows in one direction only.

As shown in FIG. 4, natural gas is supplied to gas booster module 400 from a utility service via an inlet pipe 402. A low pressure switch 404 (denoted "LPS1") is installed along inlet pipe 402 and performs a function similar to that performed by low pressure switch 204 described above in reference to FIG. 2. From inlet pipe 402, natural gas flows to a common supply pipe 412 that is connected to first gas booster 420 and to second gas booster 438. An electro-hydraulic gas safety valve 406 (denoted "GSV1") is installed between inlet pipe 402 and common supply pipe 412 and controls the flow of gas there between in a manner similar to that described above with respect to gas safety valve 206 of FIG. 2. A proof of closure (POC) switch 408 is further provided as an auxiliary contact to gas safety valve 406 and performs a function similar to that described above with respect to POC switch 208 of FIG. 2.

From common supply pipe 412, natural gas can flow along one of three paths, depending upon the mode of operation of gas booster module 400. In a first mode of operation, the only gas booster that is operating is first gas booster 420. During this mode of operation, natural gas flows from common supply pipe 412 to first gas booster module 420 via a first gas booster inlet pipe 454. Pressure-boosted natural gas is then discharged from first gas booster 420 to a common discharge pipe 462 via a first gas booster discharge pipe 458 and a second gas booster bypass pipe 484.

In a second mode of operation, the only gas booster that is operating is second gas booster 438. During this mode of operation, natural gas flows from common supply pipe 412 to second gas booster module 438 via a first gas booster bypass pipe 482 and a second gas booster inlet pipe 456. Pressure-boosted natural gas is then discharged from second gas booster 438 to common discharge pipe 462 via a second gas booster discharge pipe 460.

In a third mode of operation, both gas boosters are operating. This mode of operation can optionally be used to achieve an increased level of gas pressure as compared to either the first or second operating modes. During this mode of operation, natural gas flows from common supply pipe 412 to first gas booster 420 via first gas booster inlet pipe 454. Pressure-boosted natural gas is then discharged from first gas booster 420 to the inlet of second gas booster 438 via first gas booster discharge pipe 458 and second gas booster inlet pipe 456. Pressure-boosted natural gas is then discharged from second gas booster 438 to common discharge pipe 462 via second gas booster discharge pipe 460.

In a like manner to the gas boosters of gas booster module 200, each of gas boosters 420 and 438 is connected to respective inlet and discharge pipes via flexible connectors. In particular, first gas booster 420 is connected to first gas booster inlet and discharge pipes 454 and 458 via flexible connector 418 (denoted "FC2") and flexible connector 428 (denoted "FC1"), respectively, and second gas booster 438 is connected to second gas booster inlet and discharge pipes 456 and 460 via flexible connector 436 (denoted "FC4") and flexible connector 446 (denoted "FC2"), respectively.

Furthermore, a manual isolation valve 416 (denoted "V2") is provided along first gas booster inlet pipe 454 while another manual isolation valve 432 (denoted "V1") is provided along first gas booster discharge pipe 458. These manual isolation valves can be closed to stop the flow of gas to first gas booster 420, thereby allowing first gas booster 420 to be inspected, serviced or replaced. In a like manner, manual isolation valves 434 (denoted "V4") and 450 (denoted "V3") are provided along second gas booster inlet pipe 456 and second gas booster discharge pipe 460, respectively, and may be closed to allow second gas booster 238 to be inspected, serviced or replaced.

From common discharge pipe 462, natural gas flows to power generation equipment via a pipe or system of pipes (not shown in FIG. 4). As shown in FIG. 4, installed along common discharge pipe 462 are a high pressure switch 466 (denoted "HPS1"), a low pressure switch 468 (denoted "LPS2"), an analog pressure transmitter 470 (denoted "PT1") and a flame arrestor 472 (denoted "FA1"). These components perform a similar function to high pressure switch 266, low pressure switch 268, analog pressure transmitter 270 and flame arrestor 272, respectively, as described above in reference to FIG. 2.

Like gas booster module 200 described above in reference to FIG. 2, gas booster module 400 also includes a bypass system that can be used to avoid overheating of the gas booster motors during light load conditions. In particular, gas booster module 400 includes a bypass pipe 474 that connects second gas booster discharge pipe 460 and second gas booster bypass pipe 484 back to common supply pipe 412. Based on the state of a motorized valve 476 (denoted "MV1") installed along bypass pipe 474, a certain amount of the natural gas that would normally flow to common discharge pipe 462 may be recirculated back to common supply pipe 412 to feed the inlet of first gas booster 420, second gas booster 438, or both. While passing through bypass pipe 474, the recirculated natural gas will pass through a mechanical cooling system 478 that can be used to cool the natural gas.

Figure 5A:
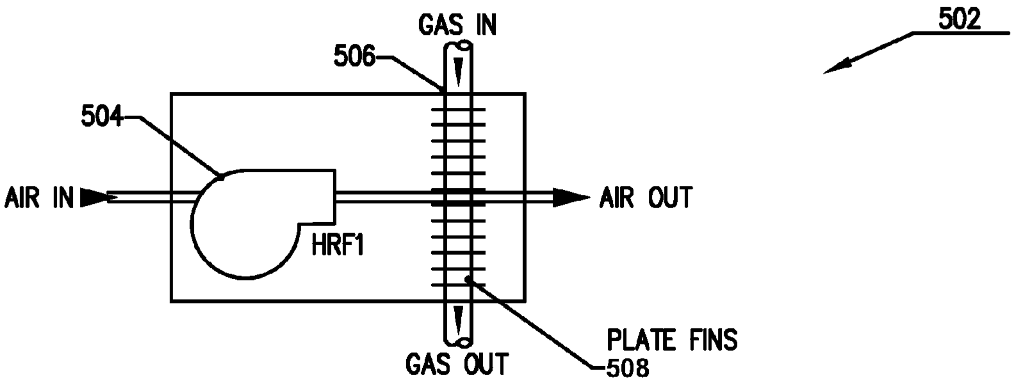
FIG. 5A shows an air cooling system that may be used in a gas booster module in accordance with an embodiment of the present invention.
Figure 5B:
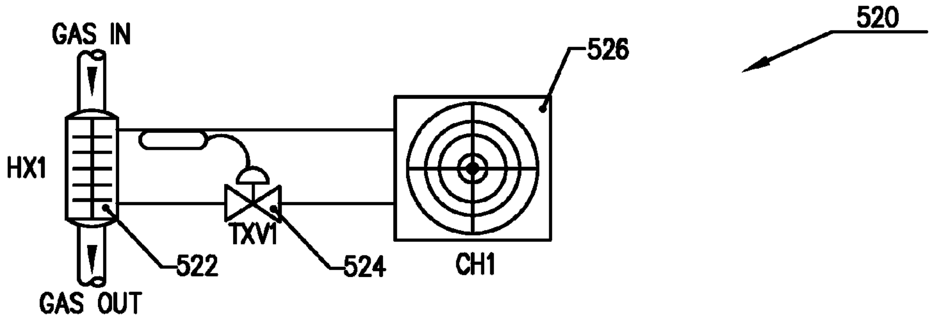
FIG. 5B shows a refrigeration-based cooling system that may be used in a gas booster module in accordance with an embodiment of the present invention.
Figure 5C:
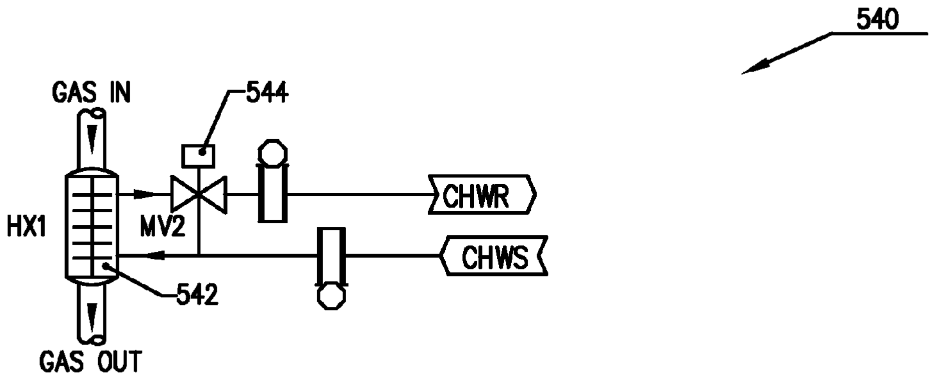
FIG. 5C shows a cooling system based on chilled water that may be used in a gas booster module in accordance with an embodiment of the present invention.

FIGS. 5A, 5B and 5C depict various types of systems that can be used to implement mechanical cooling system 478. In particular, FIG. 5A shows an air cooling system 502 in which plate fins 508 are connected to a portion of bypass pipe 506. In accordance with such a system, a heat rejection fan 504 (denoted "HRF1") blows air over pipe 506 and plate fins 508, thereby cooling the natural gas passing through pipe 506. FIG. 5B shows a refrigeration-based cooling system 520 in which the natural gas passes through a heat exchanger 522 (denoted "HX1") that operates to cool the natural gas. The amount of cooling that is applied is controlled through the operation of a thermostatic expansion valve 524 (denoted "TXV1") which in turn controls the amount of refrigerant that is supplied from and returned to a chiller 526 (denoted "CH1"). FIG. 5C shows a chilled water system 540 in which the natural gas passed through a heat exchanger 542 (denoted "HX1") that operates to cool the natural gas. The amount of cooling that is applied is controlled through the operation of a motorized valve 544 (denoted "MV2"), which in turn controls an amount of chilled water that is supplied and returned through heat exchanger 542. In FIG. 5C, the chilled water supply is denoted "CHWS" and the chilled water return is denoted "CHWR". The system of FIG. 5C is similar to that used in gas booster module 200, discussed above in reference to FIG. 2. It should be noted that each the mechanical cooling systems depicted in FIG. 5A and FIG. 5B could also be used to implement gas booster module 200 discussed above in reference to FIG. 2.

By monitoring the temperature of the natural gas flowing through gas booster module 400, the control system associated therewith can modulate the amount of gas that is recirculated through the bypass system via the controlled opening and closing of motorized valve 476. In addition, in the implementations of mechanical cooling system 478 depicted in FIGS. 5B and 5C, the control system can modulate the amount of cooling that is applied to the recirculated gas through the controlled opening and closing of thermostatic expansion valve 524 and motorized valve 544 respectively. In order to monitor the temperature of natural gas flowing through gas booster module 400, the module includes a plurality of temperature sensors including a temperature sensor 414 (denoted "T4"), a temperature sensor 426 (denoted "T2"), a temperature sensor 444 (denoted "T3") and a temperature sensor 464 (denoted "T1"). In addition to using the temperature information provided by temperature sensors 414, 426, 444 and 464 to control the amount of gas that is recirculated through the bypass system as well as the amount of cooling that is applied to such recirculated gas, the control system can also monitor such temperature information to detect abnormal or unsafe operating conditions.

Gas booster module 400 includes other temperature switches and sensors for control and safety reasons. For example, first gas booster 420 and second gas booster 438 each include a motor temperature switch that is mounted in the windings of the motor of the gas booster. In particular, first gas booster 420 includes a motor temperature switch 424

(denoted "MTS1") and second gas booster 438 includes a motor temperature switch 442 (denoted "MTS2"). These switches operate in a similar fashion to motor temperature switches 224 and 242 described above in reference to FIG. 2. As shown in FIG. 4, a temperature switch is also surface mounted on the metal casing of each of first gas booster 420 and second gas booster 438. In particular, a temperature switch 422 (denoted "TS1") is surface mounted on first gas booster 420 and a temperature switch 440 (denoted "TS2") is surface mounted on second gas booster 438. These temperature switches operate in a like fashion to temperature switches 222 and 240 as described above in reference to FIG. 2.

As also shown in FIG. 4, a first pressure gauge 430 (denoted "P2") is installed along first gas booster discharge pipe 458 and a second pressure gauge 448 (denoted "P1") is installed along second gas booster discharge pipe 460. The pressure gauges may be visibly inspected to determine the level of gas pressure within the respective gas booster discharge pipes.

In one implementation, both first gas booster 420 and second gas booster 438 are units capable of providing pressure boosts of approximately 35 inWC at gas flows of up to approximately 46,300 CFH. It should be noted, however, that running first and second gas boosters 420 and 438 in series will not result in a total pressure boost of 75 inWC. Rather, due to the fact that the pressure-boosted gas being supplied from the discharge of first gas booster 420 to the inlet of second gas booster 438 has an increased temperature and volume, second gas booster 438 will not operate at full efficiency. Consequently, the amount of pressure boost provided by second gas booster 438 in this mode of operation will be less than 35 inWC, and will likely be in the range of approximately 15-20 inWC, yielding a total pressure boost of approximately 50-55 inWC. Nevertheless, this total pressure boost resulting from serial operation of first gas booster 420 and second gas booster 438 still exceeds the pressure boost resulting from the operation of one unit alone.

Figure 9:
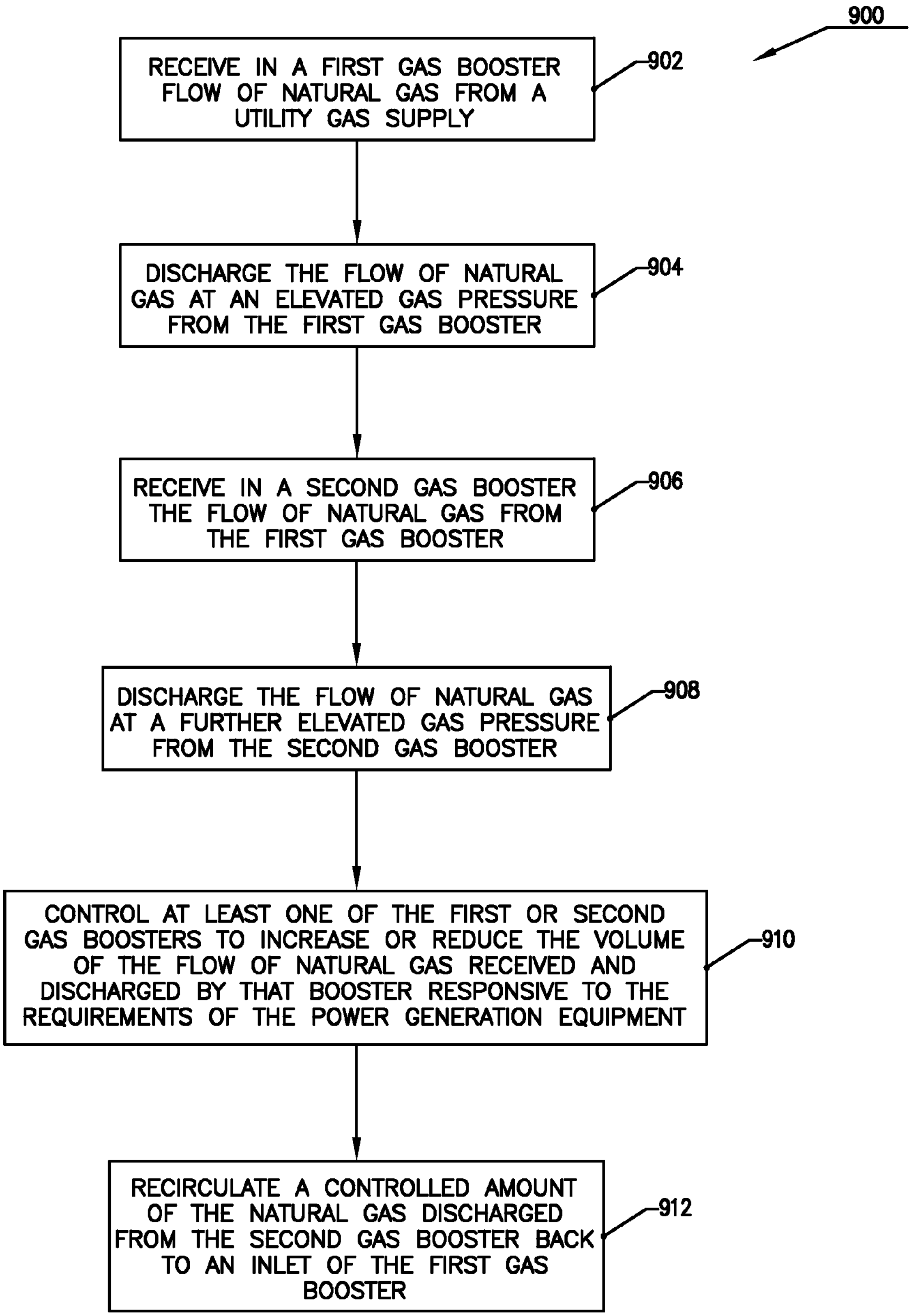
FIG. 9 is a flowchart of a method for supplying natural gas to power generation equipment in accordance with an alternate embodiment of the present invention.

FIG. 9 is a flowchart of an example method 900 for supplying natural gas to power generation equipment using a gas booster module in accordance with the present invention. The method of flowchart 900 will be described with reference to gas booster module 400 of FIG. 4, as described above, although the method is not limited to that embodiment.

As shown in FIG. 9, the method of flowchart 900 begins at step 902, in which a flow of natural gas from a utility gas supply is received by first gas booster 420. At step 904, first gas booster 420 discharges the flow of natural gas at an elevated gas pressure. At step 906, second gas booster 438 receives the flow of natural gas from the first gas booster. At step 908, second gas booster 438 discharges the flow of natural gas at a further elevated gas pressure to the power generation equipment. At step 910, first gas booster 420 and/or second gas booster 438 is controlled to increase or reduce the volume of the flow of natural gas received and discharged by that booster responsive to the requirements of the power generation equipment. At step 912, a controlled amount of natural gas discharged from the second gas booster is recirculated back to the inlet of the first gas booster.

D. Gas Booster Module Having Single-Stage and Multi-Stage Gas Boosters in Accordance with an Embodiment of the Present Invention As discussed above, gas booster module 200 of FIG. 2 includes first and second gas boosters 220 and 238, respectively, which in one embodiment are single-stage gas boosters having a similar or identical design. In an alternate embodiment of the present invention, one of the gas boosters is a single-stage gas booster while the other gas booster is a multi-stage gas booster. The multi-stage gas booster is capable of providing a greater gas pressure boost than the single stage machine, although it has a higher minimum gas flow requirement. Additionally, the multi-stage gas booster is also more expensive to purchase and maintain than a single-stage gas booster.

By using a combination of a single-stage gas booster and a multi-stage gas booster, operation of the gas booster module can be adapted to support different load conditions. Thus, using power generation plant 100 of FIG. 1 as an example, when microturbines 112 alone are operating, the single-stage gas booster can be operated to supply pressure-boosted gas to that equipment. However, when standby generator 110 is also operating, generating an additional megawatt (MW) of power, the multi-stage gas booster can instead be operated to support the heavier load condition. Redundancy is still provided, in that either gas booster can be operated when the other gas booster is off-line for inspection, servicing or repair. However, as noted above, in order to run the multi-stage gas booster, enough power generation equipment must be operating to ensure that the high minimum gas flow requirements of the multi-stage gas booster are met.

As will be appreciated by persons skilled in the art, like gas booster module 200 of FIG. 2, gas booster module 400 of FIG. 4 may also be implemented using a combination of a single-stage gas booster and a multi-stage gas booster to provide adaptable operation for supporting different load conditions.

E. Control System in Accordance with an Embodiment of the Present Invention

A gas delivery system in accordance with the present invention includes a control system that is configured to receive information from the gas booster module as well as other system components, and automatically perform actions in response to that information. Such actions may include but are not limited to increasing or decreasing gas flow through the gas booster module, increasing or decrease an amount of gas recirculated through a bypass system of the gas booster module and/or the amount of cooling applied to such recirculated gas, turning on or off one or more gas boosters, shutting off the flow of gas to or from the gas booster module, or generating one or more alarms.

Figure 6:
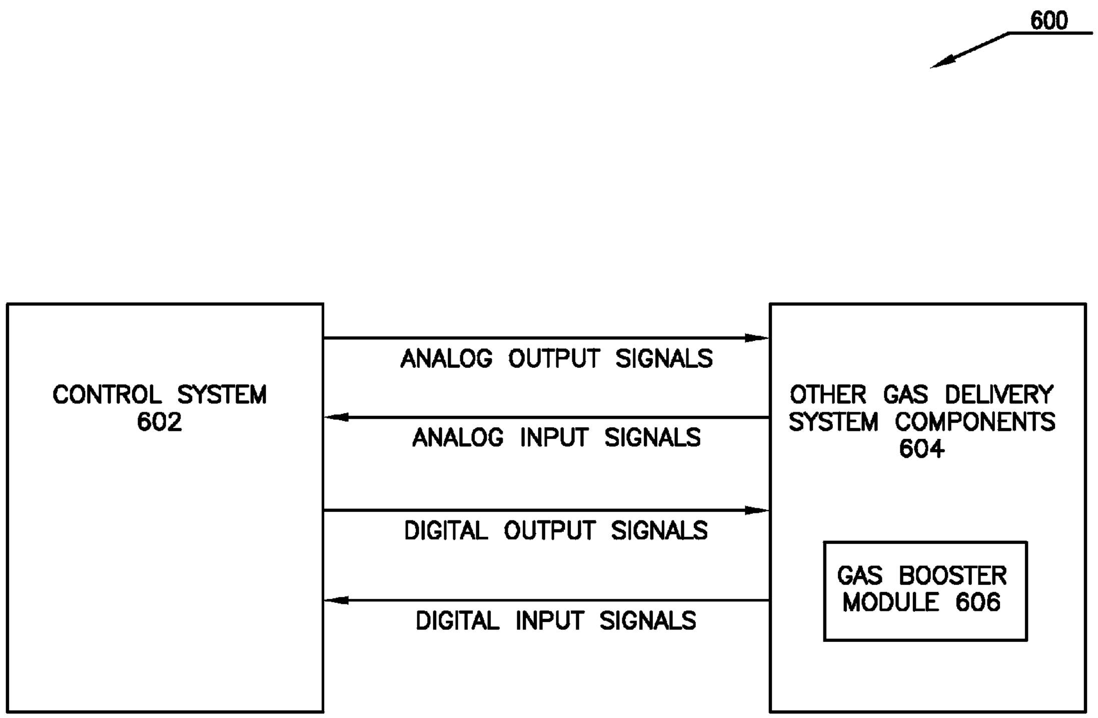
FIG. 6 is a diagram that shows the exchange of digital and analog signals between a control system and other components of a gas delivery system in accordance with an embodiment of the present invention.

FIG. 6 is a high-level system diagram of a gas delivery system 600 in accordance with an embodiment of the present invention that includes a control system 602. As shown in FIG. 6, control system 602 exchanges digital and analog signals with other gas delivery system components 604, which include a gas booster module 606. In particular, as shown in FIG. 6, control system 602 receives digital and analog input signals from gas delivery system components 604. Additionally, control system 602 transmits digital and analog output signals to gas delivery system components 604.

As will be discussed in more detail herein, components of gas delivery system 600 other than gas booster module 606 that communicate with control system 602 may include without limitation a temperature sensor, flame detector, and methane gas detector located in the same room as gas booster module 606, an exhaust fan located near gas booster module 606, one or more emergency power off buttons electrically connected to gas booster module 606, a building fire alarm system, utility gas meters, and an annunciator control panel.

Figure 7:
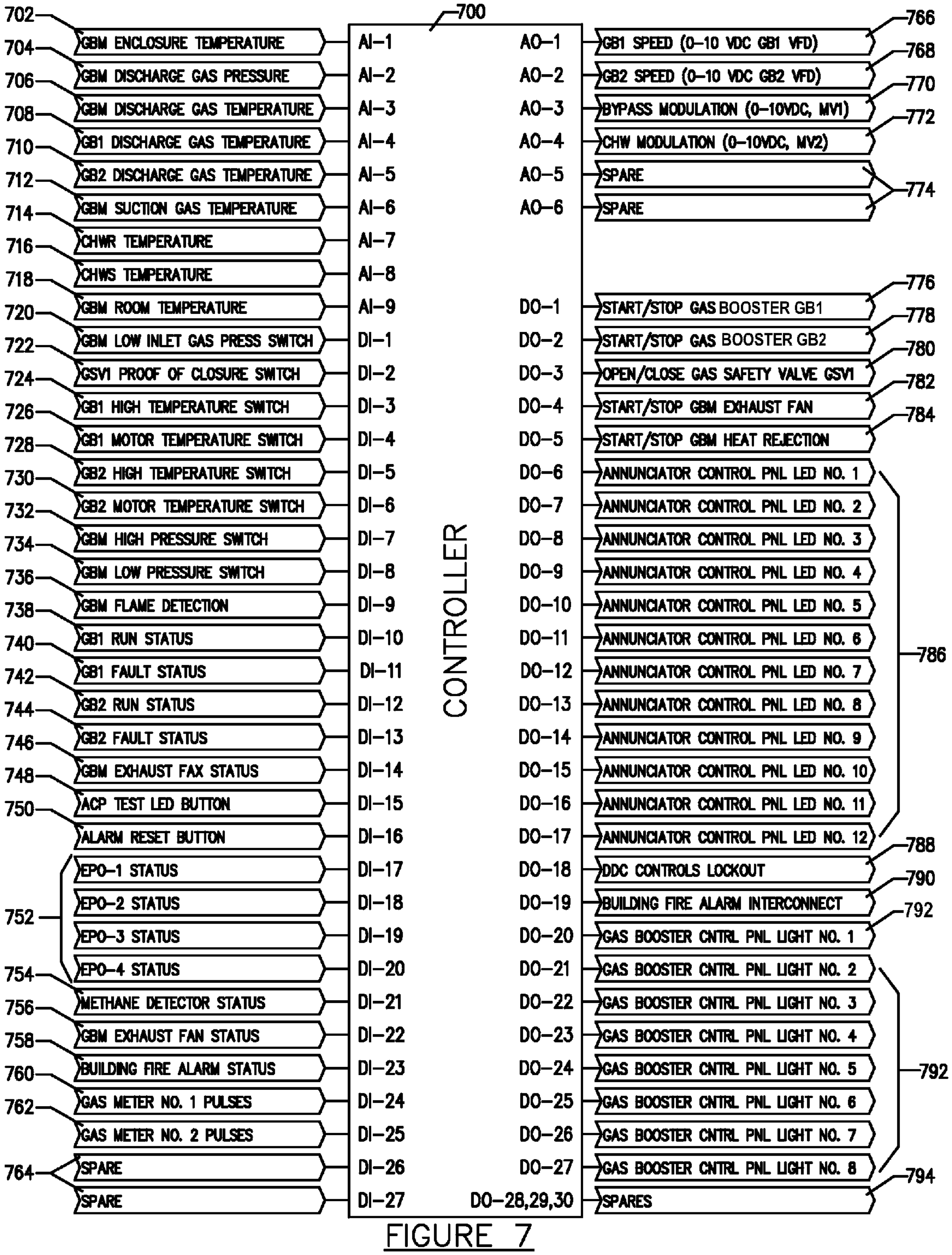
FIG. 7 depicts a controller that may be used to implement a gas delivery system in accordance with an embodiment of the present invention, as well as associated input and output signals.

FIG. 7 depicts a controller 700 and associated input and output signals that may be used to implement control system 602 of FIG. 6. In an embodiment, controller 700 is a commercially-available programmable logic controller (PLC) that has been configured for use in a gas delivery system in accordance with an embodiment of the present invention. For example, in one implementation, controller 700 is a Direct Digital Control (DDC) controller designed and sold by Automated Logic Corporation of Atlanta, Ga. However, this example is not intended to be limiting and persons skilled in the art will readily appreciate that a wide variety of hardware- and/or software-based devices and systems may be used to implement controller 700.

As shown in FIG. 7, controller 700 receives a plurality of analog and digital input signals and also generates a plurality of analog and digital output signals. Generally speaking, controller 700 monitors the received digital and analog input signals to ensure that the gas delivery system is operating safely and efficiently. If controller 700 detects an unsafe operating condition, it can perform a variety of actions through generation of the appropriate digital and/or analog output signals. For example, controller 700 can shut down one or both gas boosters of the gas booster module, close the gas safety valve that controls the flow of natural gas to the gas booster module, trigger a local or remote alarm, or the like. Additionally, controller 700 can control the gas boosters to ensure that the volume and pressure of the gas being discharged from gas booster module corresponds to that required by the operating power generation equipment.

The analog input signals received by controller 700 include a gas booster module (GBM) enclosure temperature signal 702 (denoted "AI-1"), a GBM discharge gas pressure signal 704 (denoted "AI-2"), a GBM discharge gas temperature signal 706 (denoted "AI-3"), a first gas booster (GB1) discharge gas temperature signal 708 (denoted "AI-4"), a second gas booster (GB2) discharge gas temperature signal 710 (denoted "AI-5"), a GBM suction gas temperature signal 712 (denoted "AI-6"), a chilled water return (CHWR) temperature signal 714 (denoted "AI-7"), a chilled water supply (CHWS) temperature signal 716 (denoted "AI-8") and a GBM room temperature signal 718 (denoted "AI-9").

GBM enclosure temperature signal 702 is an analog signal provided by a temperature sensor located within the gas booster module enclosure and is indicative of the temperature within that enclosure. GBM room temperature signal 718 is an analog signal provided by a temperature sensor located in the room within which the gas booster module has been installed.

GBM discharge gas pressure signal 704 is a signal provided by an analog pressure transmitter located along the common discharge pipe of the gas booster module, such as analog pressure transmitter 270 of FIG. 2. In addition to being monitored for information and safety purposes, this signal may also be used to determine whether or not the gas booster module is discharging natural gas at a level of pressure that is sufficient to meet the pressure requirements of the power generation equipment. If the level of pressure is too low, the speed of the operating gas booster may be increased whereas if the level of pressure is too high, the speed of the operating gas booster may be decreased.

GBM discharge gas temperature signal 706 is an analog signal provided by a temperature sensor mounted at the common discharge pipe of the gas booster module, such as temperature sensor 264 of FIG. 2. GB1 discharge gas temperature signal 708 is an analog signal provided by a temperature sensor mounted at the discharge of the first gas booster of the gas booster module, such as temperature sensor 226 of FIG. 2. GB2 discharge gas temperature signal 710 is an analog signal provided by a temperature sensor mounted at the discharge of the second gas booster of the gas booster module, such as temperature sensor 244 of FIG. 2. GBM suction gas temperature signal 712 is an analog signal provided by a temperature sensor mounted at the common supply pipe of the gas booster module, such as temperature sensor 214 of FIG. 2.

Each of signals 706, 708, 710 and 712 provides an indication of the temperature of the natural gas flowing through a certain part of the gas booster module. In addition to being monitored for information and safety purposes, as noted above in reference to FIG. 2, temperature signals 706, 708, 710 and 712 may be monitored to determine an amount of recirculation and/or cooling to be applied to the natural gas via the bypass system of the gas booster module.

CHWS temperature signal 716 is an analog signal provided by a temperature sensor mounted along the pipe that is used to supply chilled water to the mechanical cooling system located along the bypass path of the gas booster module. CHWR temperature signal 714 is an analog signal provided by a temperature sensor mounted along the pipe that is used to return the chilled water from the mechanical cooling system. For example, in FIG. 2, these signals are provided by the temperature sensors shown along the chilled water supply and return pipes connected to heat exchanger 278.

The digital input signals received by controller 700 include a GBM low inlet gas pressure switch signal 720 (denoted "DI-1"), a gas safety valve (GSV1) proof of closure switch signal 722 (denoted "DI-2"), a first gas booster (GB1) high temperature switch signal 724 (denoted "DI-3"), a first gas booster (GB1) motor temperature switch signal 726 (denoted "DI-4"), a second gas booster (GB2) high temperature switch signal 728 (denoted "DI-5"), a second gas booster (GB2) motor temperature switch signal 730 (denoted "DI-6"), a GBM high pressure switch signal 732 (denoted "DI-7"), a GBM low pressure switch signal 734 (denoted "DI-8"), a GBM flame detection signal 736 (denoted "DI-9"), a first gas booster (GB1) run status signal 738 (denoted "DI-10"), a first gas booster (GB1) fault status switch signal 740 (denoted "DI-11"), a second gas booster (GB2) run status switch signal 742 (denoted "DI-12"), a second gas booster (GB2) fault status switch signal 744 (denoted "DI-13"), a GBM exhaust fan status signal 746 (denoted "DI-14"), an annunciator control panel (ACP) test LED button signal 748 (denoted "DI-15"), an alarm reset button signal 750 (denoted "DI-16"), emergency power off (EPO) status signals 752 (denoted "DI-17", "DI-18", "DI-19" and "DI-20"), a methane detector status signal 754 (denoted "DI-21"), a GBM exhaust fan status signal 756 (denoted "DI-22"), a building fire alarm status signal 758 (denoted "DI-23"), a gas meter number 1 pulses signal 760 (denoted "DI-24"), a gas meter number 2 pulses signal 762 (denoted "DI-25") and spare digital input signals 764 (denoted "DI-26" and "DI-27").

GBM low inlet gas pressure switch signal 720 is a digital signal provided by a low pressure switch, such as low pressure switch 204 of FIG. 2, that is installed along the inlet pipe to the gas booster module and that operates to ensure that gas pressure in the pipe always exceeds a certain minimum pressure level as specified by the utility. GBM low inlet gas pressure switch signal 270 indicates whether this switch is open or closed.

GSV1 proof of closure switch signal 722 is a digital signal provided by a proof of closure (POC) switch, such as POC switch 208 of FIG. 2, that indicates whether the gas safety valve that controls the flow of natural gas into the gas blower module is open or closed.

GB1 high temperature switch signal 724 is a digital signal provided by a temperature switch, such as temperature switch 222 of FIG. 2, that is surface mounted on the metal casing of the first gas booster of the gas booster module. GB2 high temperature switch signal 728 is a digital signal provided by a temperature switch, such as temperature switch 240 of FIG. 2, that is surface mounted on the metal casing of the second gas booster of the gas booster module. These signals indicate whether the respective temperature switches are open or closed.

GB1 motor temperature switch signal 726 is a digital signal provided by a motor temperature switch, such as motor temperature switch 224 of FIG. 2, that is mounted in the windings of the first gas booster of the gas booster module. GB2 motor temperature switch signal 730 is a digital signal provided by a motor temperature switch, such as motor temperature switch 242 of FIG. 2, that is mounted in the windings of the second gas booster of the gas booster module. These signals indicate whether the respective motor temperature switches are open or closed.

GBM high pressure switch signal 732 is a digital signal provided by a high pressure switch, such as high pressure switch 266 of FIG. 2, that is located along the common discharge pipe of the gas booster module. GBM low pressure switch signal 734 is a digital signal provided by a low pressure switch, such as low pressure switch 268 of FIG. 2, that is also located along the common discharge pipe of the gas booster module. Signals 732 and 734 respectively indicate the state (open or closed) of the high pressure switch and the low pressure switch.

GBM flame detection signal 736 is a digital signal provided by a sensor that is mounted in the room within which the gas booster module is installed. The sensor utilizes ultraviolet and infrared technology to detect a flame appearing on or around the gas booster module. This situation may occur where natural gas has escaped from a breach in the gas booster module and is ignited.

GB1 run status signal 738 and GB1 fault status signal 740 are digital signals provided by the variable frequency drive associated with the first gas booster of the gas booster module. These signals respectively indicate whether or not the drive associated with the first gas booster is running and whether or not the drive is in a fault state. Likewise, GB2 run status signal 742 and GB2 fault status signal 744 are digital signals provided by the variable frequency drive associated with the second gas booster of the gas booster module. These signals respectively indicate whether or not the drive associated with the second gas booster is running and whether or not the drive is in a fault state.

GBM exhaust fan status signal 746 and GBM exhaust fan status signal 756 are digital signals provided by a mechanical exhaust fan that is used to ventilate the room in which the gas booster module is installed. Each signal 746 and 756 indicates whether the exhaust fan is on or off.

ACP test LED button signal 748 is a digital signal provided by an annunciator control panel located somewhere within the building within which the power generation plant is located, such as in the lobby. The annunciator control panel includes a plurality of LEDs which can be selectively activated by controller 700 to indicate the status of a corresponding element of the gas delivery system. The annunciator control panel also includes a test LED button, which, when activated by a user, generates signal 748. Upon receipt of signal 748, controller 700 sends digital signals to activate the plurality of LEDs. If one of the LEDs does not light up in response to activation of the test LED button, then the user will know that the LED and/or the logic and circuitry associated therewith, needs to be repaired or replaced. The annunciator control panel provides for enhanced local monitoring and control of the gas delivery system and may be necessary to comply with local safety regulations and requirements.

Like ACP test LED button signal 748, alarm reset button signal 750 is also a digital signal provided by the annunciator control panel. In particular, the annunciator control panel includes an alarm reset button, which, when activated by a user, generates signal 750. Upon receipt of signal 750, controller 700 will reset an alarm that was previously activated within the building by controller 700 or some other entity.

EPO status signals 752 are digital signals provided by corresponding emergency power off buttons located at various locations in the building within which the power generation plant is installed. For example, an emergency power off button may be installed in the room within which the gas blower module is installed, in the lobby, and on the rooftop. Each of these emergency power off buttons may be activated by a user in order to shut down the power generation plant. For example, activation of these emergency power off buttons may result in both gas boosters of the gas booster module being shut down and closure of the gas safety valve that controls the flow of natural gas into the gas booster module. Each of signals 752 indicates a state of a corresponding emergency power off button.

Methane detector status signal 754 is a digital signal provided by a device installed in the room within which the gas booster is installed. This device is designed to detect the presence of methane gas, which might indicate a breach in the gas delivery system. Signal 754 indicates whether or not methane has been detected.

Building fire alarm status signal 758 is a digital signal that may be provided from a firm alarm system installed in the building within which the power generation plant is installed. This signal indicates if a fire alarm has been triggered. Controller 700 may be configured to automatically shut down the gas delivery system upon receipt of this signal.

Gas meter number 1 pulses signal 760 and gas meter number 2 pulses signal 762 are digital signals that are provided by respective gas meters in a utility meter rig that is installed between the gas utility service and the gas delivery system (see, e.g., utility meter rig 102 of FIG. 1). These signals indicate that a certain amount of natural gas has passed through each gas meter. These signals may be used to track the total amount of gas that flows through each gas meter and that is ultimately is consumed by the gas delivery system.

Spare digital input signals 764 are digital inputs that are currently unused by controller 700 but have been provided in case the number of digital input signals needs to be expanded at some future time.

The analog output signals generated by controller 700 include a first gas booster (GB1) speed signal 766 (denoted "AO-1"), a second gas booster speed signal 768 (denoted "AO-2"), a bypass modulation signal 770 (denoted "AO-3"), a chilled water (CHW) modulation signal 772 (denoted "AO-4"), and spare analog output signals 774 (denoted "AO-5" and "AO-6").

GB1 speed signal 766 is an analog output signal that controls the speed of the variable frequency drive associated with the first gas booster of the gas booster module. GB2 speed signal 768 is an analog output signal that controls the speed of the variable frequency drive associated with the second gas booster of the gas booster module. In one implementation, each signal may vary from 0-10 VDC as selectively determined by controller 700. As discussed above, by controlling the speed of the variable frequency drives, controller 700 can modulate the amount of gas that flows through each gas booster of the gas booster module.

Bypass modulation signal 770 is an analog output signal that controls the extent to which a motorized valve, such as motorized valve 276 of FIG. 2, is opened or closed, thereby controlling the amount of natural gas that is recirculated through a bypass pipe of the gas booster module. In one implementation, bypass modulation signal 770 varies from 0-10 VDC as selectively determined by controller 700. CHW modulation signal 772 is an analog output signal that controls the extent to which a motorized valve, such as motorized valve 280 of FIG. 2, is opened or closed, thereby controlling the amount of chilled water that is supplied to cool natural gas flowing through the bypass pipe of the gas booster module. In one implementation, CHW modulation signal 772 varies from 0-10 VDC as selectively determined by controller 700.

Spare analog output signals 774 are analog outputs that are currently unused by controller 700 but have been provided in case the number of analog output signals needs to be expanded at some future time.

The digital output signals generated by controller 700 include a start/stop first gas booster (GB1) signal 776 (denoted "DO-1"), a start/stop second gas booster (GB2) signal 778 (denoted "DO-2"), an open/close gas safety valve (GSV1) signal 780 (denoted "DO-3"), a start/stop GBM exhaust fan signal 782 (denoted "DO-4"), a start/stop GBM heat rejection signal 784 (denoted "DO-5"), ACP LED signals 786 (denoted "DO-6" through "DO-17"), DDC controls lockout signal 788 (denoted "DO-18"), building fire alarm interconnect signal 790 (denoted "DO-19"), gas blower control panel (GBCP) light signals 792 (denoted "DO-20" through "DO-27") and spare digital output signals 794 (denoted "DO-28", "DO-29" and "DO-30").

Start/stop GB1 signal 776 is a digital output signal that is used to start or stop operation of the first gas booster of the gas booster module. Start/stop GB2 signal 778 is a digital output signal that is used to start or stop operation of the second gas booster of the gas booster module. Open/close GSV1 signal 780 is a digital output signal that is used to open or close the gas safety valve, such as gas safety valve 206 of FIG. 2, used to control the flow of natural gas into the gas booster module. Start/stop GBM heat rejection signal 784 is a digital output signal that is used to start or stop the mechanical cooling system that is used to cool natural gas being recirculated through the bypass pipe of the gas booster module.

ACP LED signals 786 are digital output signals that are used to activate respective LEDs located on an annunciator control panel associated with the control system. As noted above, each of the plurality of LEDs can be selectively activated by controller 700 to indicate the status of a corresponding element of the gas delivery system.

DDC controls lockout signal 788 is a digital output signal of controller 700. When activated, signal 778 triggers a relay that closes the gas safety valve that controls the flow of gas into the gas booster module and places the gas safety valve in a state where it must be manually reset before it can be re-opened.

Building fire alarm interconnect signal 790 is a digital output signal that can be used to provide an indication to the building's fire alarm system that there is a problem with the gas delivery system.

GBCP light signals 792 are digital output signals that are used to control the state of LEDs that are located on the gas booster control panel (see, e.g., control panel 308 of FIG. 3). These LEDs can be used to indicate status of various elements within or associated with the gas booster module.

Spare digital output signals 794 are digital outputs that are currently unused by controller 700 but have been provided in case the number of digital output signals needs to be expanded at some future time.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A gas booster module, comprising:

a common supply pipe;

a common discharge pipe;

a first gas booster having an inlet connected to the common supply pipe and a discharge connected to the common discharge pipe;

a second gas booster having an inlet connected to the common supply pipe and a discharge connected to the common discharge pipe;

a bypass pipe connected between the common discharge pipe and the common supply pipe;

a refrigeration-based cooling system connected to the bypass pipe, the refrigeration-based cooling system adapted to cool natural gas flowing through the bypass pipe; and a motorized valve connected to the bypass pipe, the motorized valve controllable to adjust an amount of natural gas that will flow from the common discharge pipe to the common supply pipe;

wherein each of the first and second gas boosters is independently operable to receive a flow of natural gas from the common supply pipe and to discharge the flow of natural gas to the common discharge pipe at an elevated gas pressure;

wherein each of the first and second gas boosters includes a variable frequency drive that is automatically controllable, based at least on a signal provided by a pressure transmitter located along the common discharge pipe, to increase or reduce the volume of the flow of natural gas received and discharged by that booster responsive to the requirements of power generation equipment connected to the gas booster module via the common discharge pipe; and wherein the refrigeration-based cooling system includes:

a chiller;

a heat exchanger connected to the chiller via a refrigerant supply pipe and a refrigerant return pipe;

a thermostatic expansion valve connected to the refrigerant supply pipe and the refrigerant return pipe, the thermostatic expansion valve being controllable to adjust an amount of refrigerant supplied from the chiller to the heat exchanger via the refrigerant supply pipe and an amount of refrigerant returned from the heat exchanger to the chiller via the refrigerant return pipe.

2. The gas booster module of claim 1, wherein each of the first and second gas boosters are single stage gas boosters.

3. The gas booster module of claim 1, wherein the first gas booster is a single stage gas booster and the second gas booster is a multi-stage gas booster.

4. The gas booster module of claim 1, wherein the discharge of the first gas booster is connected to the inlet of the second gas booster, thereby permitting the first and second gas boosters to be operated in series.

5. A power generation system, comprising:

power generation equipment; and a gas delivery system configured to provide natural gas from a utility gas supply to the power generation equipment, the gas delivery system including:

a gas booster module operable to receive a flow of natural gas from the utility gas supply and to discharge the flow of natural gas to the power generation equipment at an elevated gas pressure, the gas booster module including a supply pipe and a discharge pipe;

a bypass pipe connected between the discharge pipe and the supply pipe;

a chilled water system connected to the bypass pipe, the chilled water system adapted to cool natural gas flowing through the bypass pipe;

a motorized valve connected to the bypass pipe, the motorized valve controllable to adjust an amount of natural gas that will flow from the discharge pipe to the supply pipe; and a control system electrically connected to a variable frequency drive of the gas booster module, the control system configured to control the volume of the flow of natural gas to and from the gas booster module by automatically controlling, based at least on a signal provided by a pressure transmitter located along the discharge pipe of the gas booster module, the speed of the variable frequency drive responsive to the requirements of the power generation equipment;

wherein the chilled water system includes:

a chilled water supply;

a heat exchanger connected to the chilled water supply via a chilled water supply pipe and a chilled water return pipe; and a motorized valve connected to the chilled water supply pipe and the chilled water return pipe, the motorized valve being controllable to adjust an amount of water supplied from the chilled water supply to the heat exchanger via the chilled water supply pipe and an amount of water returned from the heat exchanger via the chilled water return pipe.

6. The power generation system of claim 5, wherein the power generation equipment comprises one or more microturbines.

7. The power generation system of claim 6, wherein the power generation equipment further comprises a standby generator for starting the one or more microturbines in the absence of grid-supplied electric power.

8. The power generation system of claim 5, wherein the gas booster module comprises first and second gas boosters each of which is independently operable to receive the flow of natural gas from the utility gas supply and to discharge the flow of natural gas to the power generation equipment at an elevated gas pressure.

9. The power generation system of claim 8, wherein the first and second gas boosters are single stage gas boosters.

10. The power generation system of claim 8, wherein the first gas booster is a single stage gas booster and the second gas booster is a multi-stage gas booster.

11. The power generation system of claim 8, wherein the first and second gas boosters are operable in series to receive the flow of natural gas from the utility gas supply and to discharge the flow of natural gas to the power generation equipment at an elevated gas pressure.

12. The power generation system of claim 8, wherein the control system is further configured to shut off the flow of natural gas from the utility gas supply to the gas booster module responsive to detection of an unsafe operating condition.

13. The power generation system of claim 8, wherein the control system is further configured to control an amount of gas that is recirculated from the discharge pipe of the gas booster module to the supply pipe of the gas booster module responsive to an increase in the temperature of natural gas flowing through the gas booster module.

14. A method for supplying natural gas to power generation equipment, comprising:

receiving in a selected one of a first gas booster and a second gas booster a flow of natural gas from a utility gas supply;

discharging the flow of natural gas at an elevated gas pressure from the selected gas booster to the power generation equipment;

automatically controlling, based at least on a signal provided by a pressure transmitter located along a common discharge pipe connected to respective discharges of the first gas booster and the second gas booster, a variable frequency drive of the selected gas booster to increase or reduce the volume of the flow of natural gas received and discharged by that booster responsive to the requirements of the power generation equipment;

controlling a motorized valve to adjust an amount of natural gas that flows through a bypass pipe that connects the common discharge pipe to a common supply pipe that is connected to respective inlets of the first gas booster and the second gas booster; and controlling a refrigeration-based cooling system that is connected to the bypass pipe and includes a chiller, a heat exchanger connected to the chiller via a refrigerant supply pipe and a refrigerant return pipe, and a thermostatic expansion valve connected to the refrigerant supply pipe and the refrigerant return pipe, wherein controlling the refrigeration-based cooling system includes controlling the thermostatic expansion valve to adjust an amount of refrigerant supplied from the chiller to the heat exchanger via the refrigerant supply pipe and an amount of refrigerant returned from the heat exchanger to the chiller via the refrigerant return pipe.

15. The method of claim 14, wherein each of the first and second gas boosters are single stage gas boosters.

16. The method of claim 14, wherein the first gas booster is a single stage gas booster and the second gas booster is a multi-stage gas booster.

17. A method for supplying natural gas to power generation equipment, comprising:

receiving in a first gas booster a flow of natural gas from a utility gas supply;

discharging the flow of natural gas at an elevated gas pressure from the first gas booster;

receiving in a second gas booster the flow of natural gas from the first gas booster;

discharging the flow of natural gas at a further elevated gas pressure from the second gas booster to the power generation equipment;

automatically controlling, based at least on a signal provided by a pressure transmitter located along a common discharge pipe connected to respective discharges of the first gas booster and the second gas booster, a speed of a variable frequency drive in at least one of the first or second gas boosters to increase or reduce the volume of natural gas received and discharged by that booster responsive to the requirements of the power generation equipment;

controlling a motorized valve to adjust an amount of natural gas that flows through a bypass pipe that connects the common discharge pipe to a common supply pipe that is connected to respective inlets of the first gas booster and the second gas booster; and controlling a chilled water system that is connected to the bypass pipe and includes a chilled water supply, a heat exchanger connected to the chilled water supply via a chilled water supply pipe and a chilled water return pipe, and a motorized valve connected to the chilled water supply pipe and the chilled water return pipe, wherein controlling the chilled water system includes controlling the motorized valve to adjust an amount of water supplied from the chilled water supply to the heat exchanger via the chilled water supply pipe and an amount of water returned from the heat exchanger via the chilled water return pipe.

18. A gas booster module, comprising:

a common supply pipe;

a common discharge pipe;

a first gas booster having an inlet connected to the common supply pipe and a discharge connected to the common discharge pipe;

a second gas booster having an inlet connected to the common supply pipe and a discharge connected to the common discharge pipe;

a bypass pipe connected between the common discharge pipe and the common supply pipe;

a chilled water system connected to the bypass pipe, the chilled water system adapted to cool natural gas flowing through the bypass pipe; and a motorized valve connected to the bypass pipe, the motorized valve controllable to adjust an amount of natural gas that will flow from the common discharge pipe to the common supply pipe;

wherein each of the first and second gas boosters is independently operable to receive a flow of natural gas from the common supply pipe and to discharge the flow of natural gas to the common discharge pipe at an elevated gas pressure;

wherein each of the first and second gas boosters includes a variable frequency drive that is automatically controllable, based at least on a signal provided by a pressure transmitter located along the common discharge pipe, to increase or reduce the volume of the flow of natural gas received and discharged by that booster responsive to the requirements of power generation equipment connected to the gas booster module via the common discharge pipe; and wherein the chilled water system includes:

a chilled water supply;

a heat exchanger connected to the chilled water supply via a chilled water supply pipe and a chilled water return pipe;

a motorized valve connected to the chilled water supply pipe and the chilled water return pipe, the motorized valve being controllable to adjust an amount of chilled water supplied from the chilled water supply to the heat exchanger via the chilled water supply pipe and an amount of chilled water returned from the heat exchanger via the chilled water return pipe.

19. A power generation system, comprising:

power generation equipment; and a gas delivery system configured to provide natural gas from a utility gas supply to the power generation equipment, the gas delivery system including:

a gas booster module operable to receive a flow of natural gas from the utility gas supply and to discharge the flow of natural gas to the power generation equipment at an elevated gas pressure, the gas booster module including a supply pipe and a discharge pipe;

a bypass pipe connected between the discharge pipe and the supply pipe;

a refrigeration-based cooling system connected to the bypass pipe, the refrigeration-based cooling system adapted to cool natural gas flowing through the bypass pipe;

a motorized valve connected to the bypass pipe, the motorized valve controllable to adjust an amount of natural gas that will flow from the discharge pipe to the supply pipe; and a control system electrically connected to a variable frequency drive of the gas booster module, the control system configured to control the volume of the flow of natural gas to and from the gas booster module by automatically controlling, based at least on a signal provided by a pressure transmitter located along the discharge pipe of the gas booster module, the speed of the variable frequency drive responsive to the requirements of the power generation equipment;

wherein the refrigeration-based cooling system includes:

a chiller;

a heat exchanger connected to the chiller via a refrigerant supply pipe and a refrigerant return pipe;

a thermostatic expansion valve connected to the refrigerant supply pipe and the refrigerant return pipe, the thermostatic expansion valve being controllable to adjust an amount of refrigerant supplied from the chiller to the heat exchanger via the refrigerant supply pipe and an amount of refrigerant returned from the heat exchanger to the chiller via the refrigerant return pipe.

20. A method for supplying natural gas to power generation equipment, comprising:

receiving in a selected one of a first gas booster and a second gas booster a flow of natural gas from a utility gas supply;

discharging the flow of natural gas at an elevated gas pressure from the selected gas booster to the power generation equipment;

automatically controlling, based at least on a signal provided by a pressure transmitter located along a common discharge pipe connected to respective discharges of the first gas booster and the second gas booster, a variable frequency drive of the selected gas booster to increase or reduce the volume of the flow of natural gas received and discharged by that booster responsive to the requirements of the power generation equipment;

controlling a motorized valve to adjust an amount of natural gas that flows through a bypass pipe that connects the common discharge pipe to a common supply pipe that is connected to respective inlets of the first gas booster and the second gas booster; and controlling a chilled water system that is connected to the bypass pipe and includes a chilled water supply, a heat exchanger connected to the chilled water supply via a chilled water supply pipe and a chilled water return pipe, and a motorized valve connected to the chilled water supply pipe and the chilled water return pipe, wherein controlling the chilled water system includes controlling the motorized valve to adjust an amount of chilled water supplied from the chilled water supply to the heat exchanger via the chilled water supply pipe and an amount of chilled water returned from the heat exchanger via the chilled water return pipe.

21. A method for supplying natural gas to power generation equipment, comprising:

receiving in a first gas booster a flow of natural gas from a utility gas supply;

discharging the flow of natural gas at an elevated gas pressure from the first gas booster;

receiving in a second gas booster the flow of natural gas from the first gas booster;

discharging the flow of natural gas at a further elevated gas pressure from the second gas booster to the power generation equipment;

automatically controlling, based at least on a signal provided by a pressure transmitter located along a common discharge pipe connected to respective discharges of the first gas booster and the second gas booster, a speed of a variable frequency drive in at least one of the first or second gas boosters to increase or reduce the volume of natural gas received and discharged by that booster responsive to the requirements of the power generation equipment;

controlling a motorized valve to adjust an amount of natural gas that flows through a bypass pipe that connects the common discharge pipe to a common supply pipe that is connected to respective inlets of the first gas booster and the second gas booster; and controlling a refrigeration-based cooling system that is connected to the bypass pipe and includes a chiller, a heat exchanger connected to the chiller via a refrigerant supply pipe and a refrigerant return pipe, and a thermostatic expansion valve connected to the refrigerant supply pipe and the refrigerant return pipe, wherein controlling the refrigeration-based cooling system includes controlling the thermostatic expansion valve to adjust an amount of refrigerant supplied from the chiller to the heat exchanger via the refrigerant supply pipe and an amount of refrigerant returned from the heat exchanger to the chiller via the refrigerant return pipe.

* * * * *